(12) United States Patent
Miyamoto et al.

(10) Patent No.: US 6,775,226 B1
(45) Date of Patent: Aug. 10, 2004

(54) OPTICAL RECORDING MEDIUM HAVING A PLURALITY OF INTERFERENCE LAYERS OF DIFFERENT REFRACTIVE INDEX

(75) Inventors: Makoto Miyamoto, Ome (JP); Junko Ushiyama, Kokubunji (JP); Keikichi Andoo, Musashino (JP)

(73) Assignee: Hitachi, Ltd., Tokyo (JP)

( * ) Notice: Subject to any disclaimer, the term of this patent is extended or adjusted under 35 U.S.C. 154(b) by 469 days.

(21) Appl. No.: 09/941,758

(22) Filed: Aug. 30, 2001

(30) Foreign Application Priority Data

Mar. 21, 2001 (JP) ...................................... 2001-079715

(51) Int. Cl.[7] ................................................. G11B 7/24
(52) U.S. Cl. .................................. 369/275.1; 428/64.4
(58) Field of Search .......................... 369/275.1, 275.4,
369/275.2; 428/64.1, 64.3, 64.4; 430/270.13, 320, 321

(56) References Cited

U.S. PATENT DOCUMENTS

| | | | | |
|---|---|---|---|---|
| 5,521,901 A | * | 5/1996 | Okada et al. ............. | 369/275.2 |
| 5,974,025 A | * | 10/1999 | Yamada et al. ............ | 369/288 |
| 6,432,502 B1 | * | 8/2002 | Kitaura et al. ............. | 428/64.1 |
| 6,469,977 B1 | * | 10/2002 | Kitaura et al. ............ | 369/275.1 |
| 6,607,869 B1 | * | 8/2003 | Kojima et al. ............ | 430/270.13 |

FOREIGN PATENT DOCUMENTS

| | | |
|---|---|---|
| JP | 6-338064 | 5/1993 |
| JP | 10-228676 | 11/1997 |

OTHER PUBLICATIONS

Miyamote et al ( US 2001/0016242 A1), Information Recording Medium, Aug. 23, 2001.*

* cited by examiner

*Primary Examiner*—Tan Dinh
(74) *Attorney, Agent, or Firm*—Reed Smith LLP; Stanley P. Fisher, Esq.; Juan Carlos A. Marquez, Esq.

(57) ABSTRACT

An information recording medium, which comprises three thin films of different compositions, comprising first and second interference layers and a first interface layer, stacked in this order from the laser beam incident side of a recording layer, the refractive index of the second interference layer being lower than that of any one of the first interference layer and the recording layer, the first interface layer being provided in contact with the recording layer and between the second interference layer and the recording layer, the second interference layer containing oxygen, and an oxygen barrier layer having a smaller oxygen content than that of the second interference layer being provided in contact with the second interference layer and between the second and first interface layers, can control diffusion of oxygen from the second interference layer into the recording layer and prevents deterioration of overwriting at the time of many runs of overwriting and lowering of storage life.

13 Claims, 10 Drawing Sheets

OPTICAL RECORDING MEDIUM HAVING A PLURALITY OF INTERFERENCE LAYERS OF DIFFERENT REFRACTIVE INDEX

BACKGROUND OF THE INVENTION

1) Field of the Invention

The present invention relates to an information recording medium, where information is recorded by laser beam irradiation, and a method for manufacturing the information recording medium, and particularly to optical discs for overwriting such as a phase change optical disc, e.g. DVD-RAM, DVD-RW, etc., magneto-optical discs, e.g. MD, MO, etc., and a write-once optical disc, e.g. DVD-R, etc., and a method for manufacturing the same.

The information recording medium may be referred to hereinafter as "phase change optical disc" or merely by "optical disc", but in the present invention any information recording medium can be used, so far as it generates heat by laser beam irradiation and the atomic arrangement or magnetic moment is changed by the generated heat to record information. Particularly, other information mediums than disc-type information recording mediums such as an optical card, etc. can be used, irrespective of the shapes of aninformation recording medium.

Laser beam may be referred to hereinafter merely by "laser light" or merely "light", but as mentioned above, any laser beam is effective for the present invention, so far as it can generate heat on the information recording medium and can give a multiplex interference effect by a plurality of interference layers having different refractive indice. The present invention has been established by use of red laser (wavelength: 645–660 nm), but the present invention is not particularly limited to laser wavelength, but the present invention can be effectively applied to high density optical discs using a laser of relatively short wavelength such as blue laser, ultraviolet laser, etc.

2) Description of Related Art

Recently, phase change optical discs such as 2.6 GBDVD-RAM, etc. have been commercialized on the basis of such a feature as distinguished reproduction interchangeability with read-only optical discs such as DVD-ROM, DVD-Video, etc. However, 2.6 GBDVD-RAM is not satisfactory for a consumer's request for the recording capacity. There is an increasing demand for 4.7 BGDVD-RAM OR 4.7 GBDVD-RW. That is, the phase change optical discs have the same recording capacity as that of DVD-Video, so that VTR may be replaced with optical discs for video recording.

For practical use of 4.7 GBDVD-RAM, there are many problems to be solved. Conventional methods so far proposed for solving these problems will be described in detail below.

When the track pitch of an information recording medium is narrowed to about 80% of laser beam spot, generally leak-in of read signals from the adjacent information recording tracks occurs. Leak-in of read signals from information recorded in the adjacent information recording tracks is called "cross-talk". To solve this cross-talk problem, a land-groove recording system has been developed, as will be described below.

The plastic substrate of an optical disc for overwriting is in a concave-convex shape (groove shape) for tracking a laser beam, and it is usual to record information on the concave parts or on the convex parts. Recently, to improve the recording density (to narrow the track pitch), a method for individually recording information on the concave parts and on the convex parts on the basis of the concave-convex shape of the plastic substrate was developed.

The convex parts and the concave parts of the concave-convex shaped substrate will be hereinafter referred to as "lands" and "grooves", respectively. When the track pitch of an information recording medium is narrowed to about 80% of laser beam spot and information is recorded both on lands and in grooves, leak-in of read signals from adjacent information medium tracks (grooves in contrast to lands or lands in contrast to grooves) generally occurs. For example, when the information recorded on lands is to read, such problems as leak-in of read signals from the information recorded on grooves, failure to exactly read the information recorded on lands, etc. will be encountered. In the land-groove recording system, the cross-talk problem has been solved by setting the groove depth to $\lambda/7-\lambda/5$ ($\lambda$: laser wavelength) (Prior Art 1: JP-A-6-338064). The feature of this system is that even in the case of narrowing the track pitch to about 60% of laser beam spot, cross-talk from the adjacent information recording tracks (leak-in of signals from the adjacent information recording tracks) can be cancelled.

Prior art 1 is a distinguished method, but any means for controlling a phenomenon of erasing record marks on the adjacent information tracks (adjacent grooves when recorded on lands or adjacent lands when recorded in grooves) i.e. so called a cross-erase phenomenon, has not been fully taken into consideration. For example, in Prior Art 1, the distance between the recording layer and the heat diffusion layer (reflective layer) is as small as 18 nm, so that heat is diffused into the adjacent information recording tracks through the heat diffusion layer at the time of recording information. Thus, such a problem as easy occurrence of a cross-erase phenomenon is encountered (Problem 1).

On the other hand, a method for improving the reflectance by providing three interference layers having different reflectances, e.g. ZnS—$SiO_2$ layer and $SiO_2$ layer, on the laser beam incident side of the recording layer, thereby attaining a multiplex interference effect is known from No. 5 Phase Change Study Group, symposium Lecture Manuscripts, pp 9–14, 1993 (Prior Art 2). In the method of Prior Art 2, the ZnS—$SiO_2$ layer is in contact with the recording layer, and thus when several thousand runs of overwriting are carried out sulfur (S) elements in the ZnS—SiO2 layer are diffused into the recording layer, thereby lowering the reflectance (Problem 2).

To prevent lowering of the reflectance due to such several thousand runs of overwriting, a method for providing an interface layer composed of a dielectric compound with a high melting point such as $SiO_2$, $Al_2O_3$, etc. between the recording layer and the ZnS—$SiO_2$ dielectric protective layer is well known from JP-A-10-228676 (Prior Art 3).

However, when the present inventors carried out high temperature humid tests, peeling took place between the recording layer and the interface layer, and the present inventors have found that the method of Prior Art 3 is impractical (Problem 3).

In the case of combination of Prior Art 2 with Prior Art 3, there will be a total of 4 thin layers on the laser beam incident side of the recording layer, and the increased number of layers is manufacturing-wise not preferable. In Prior Arts 1, 2 and 3, occurrence of a cross-erase phenomenon is not fully taken into consideration, and in the case of narrowing the track pitch a cross-erase phenomenon occurs, depending on the thickness of the individual layers (the same problem as Problem 1).

To solve said Problems 1 to 3, the present inventors have studied improvement of the structure of an information recording medium but have encountered further Problems 4 to 11, as will be described later.

BRIEF SUMMARY OF THE INVENTION

An object of the present invention is to provide an information recording medium free from all the Problems 1 to 11.

Another object of the present invention is to provide a method for manufacturing an information recording medium at a low cost.

DETAILED DESCRIPTION OF THE INVENTION

Figure 1:
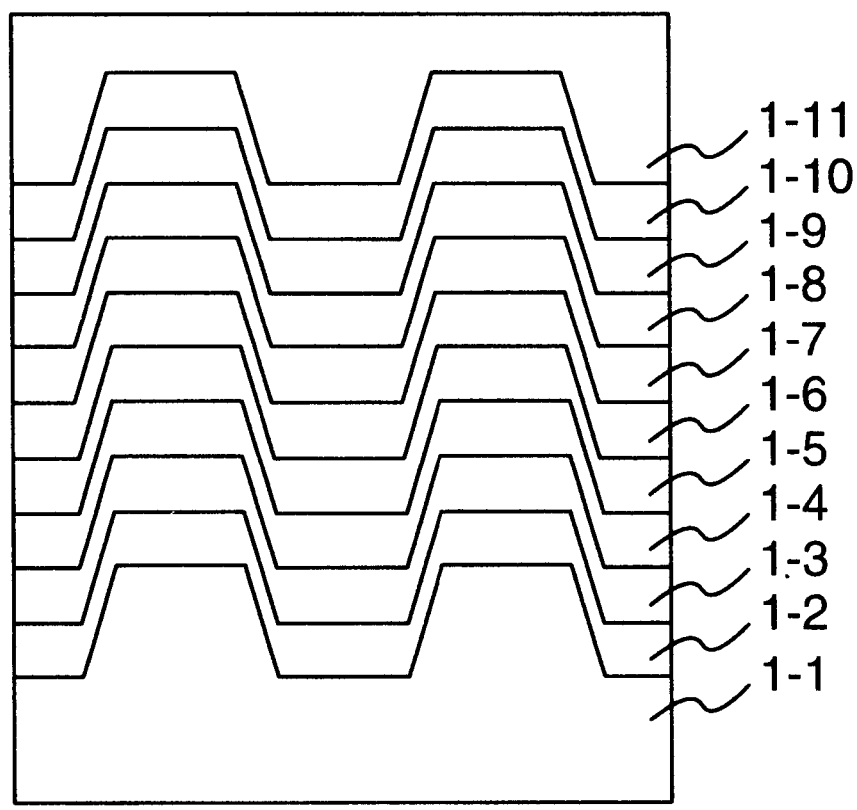
FIG. 1 is a structural view of an information recording medium according to the present invention.

A first object of the present invention is to clarify the structure of an information recording medium capable of controlling occurrence of a cross-erase phenomenon (Problem 1), to improve the reflectance (Problem 2) and to control the peeling defect (Problem 3) at the same time, thereby providing an information recording medium free from said Problems 1 to 3.

As will be described later, the present inventors proposed, as a method for solving all these Problems, a method of providing three thin films having different compositions, i.e. a first interference layer, a second interference layer and a first interface layer, formed successively in this order from the laser beam incident side of the recording layer and between the substrate and the recording layer, the reflective index of the second interference layer being made smaller than those of the first interference layer and the recording layer, and the first interface layer being provided between the second interference layer and the recording layer and in contact with the recording layer.

The method is distinguished, but when the information recording medium is mass-produced the present inventors encountered the following further problems.

It takes a very long time to obtain the second interference layer of desired thickness because of a low sputtering rate of oxides of low refractive index such as $Al_2O_3$, $SiO_2$, MgO, etc. (Problem 4).

As a result, the substrate is deformed by heating during the sputtering (Problem 5).

To avoid the problem, it is necessary to provide a cooling time for cooling the substrate during the sputtering of the individual layers (Problem 6).

Since the oxides of low refractive index are dielectrics, it is inevitable to use as RF sputtering method using an expensive sputtering apparatus (Problem 7).

As a result of said Problems 4 to 7, the production cost becomes very high (Problem 8).

The foregoing problems can be solved by a sputtering method using a sputtering target of electroconductive material such as Si, Al, Mg, etc. and an oxygen-containing sputtering gas, i.e. so called reactive sputtering method, as is well known. However, in the case of using the reactive sputtering method, the present inventors have encountered the following problems.

Read signals obtainable from the information recording medium are considerably deteriorated (Problem 9).

In the case that many runs, i.e. 10,000 or more runs of overwriting are carried out on the information, recording medium, the read signals are further deteriorated (Problem 10).

Storage life of the information recording medium is considerably lowered (Problem 11).

The present inventors have studied the causes for said Problems 9 to 10 and have clarified the following facts.

Deterioration of read signals of Problem 9 is due to the fact that the already recorded record marks are not completely erased during the overwriting of information.

Deterioration of read signals by many runs (e.g. 10,000 or more) of overwriting (Problem 10) is due to the occurrence of the same phenomenon as in Problem 9, but accelerated by such many runs of overwriting.

Lowering of storage life of Problem 11 is due to the occurrence of the same phenomenon as in Problem 9, as further progressed by long-term storage.

Problems 9 to 11 are not encountered when a nitride film is used as the second interference layer, but are encountered only when an oxide film is used.

Problems 9 to 11 are not encountered even when an oxide film is used as the second interference layer, so far as an unsaturated oxide such as SiO, AlO, MgO, etc. whose oxidation degree is not fully attained, is used.

From the aforementioned results of studies, the present inventors have derived the following assumption:

When films of $SiO_2$, $Al_2O_3$ or MgO is formed by a reactive sputtering method using a metal such as Si, Al or Mg, and oxygen to form the second interference layer, the oxygen in the sputtering gas remains in the film, as not fully reacted. The metal to be oxidized, such as Si, Al or Mg is thoroughly oxidized, but excess oxygen exists in the film. Such oxygen diffuses into the recording film to lower the crystallization rate of the recording film, and thus the already recorded record marks are not fully erased.

The diffusion of the oxygen is further progressed by heat generation by many runs of overwriting or long-term storage, resulting in deterioration of read signals after many runs of overwriting and lowering of storage life.

The essential of the present invention is to newly provide an oxygen barrier layer (protective layer) between the second interference layer and the first interface layer to control the diffusion of oxygen. The method of providing an oxygen barrier layer according to the present invention will be described in detail below.

The object of the present invention can be attained by using the following information recording media:

(1) An information recording medium for recording information by changes in at least one of atomic arrangement and electronic state by laser beam irradiation, which comprises at least a substrate having a groove shape with a groove depth dg. And a recording layer having a shape corresponding to the groove shape, and three thin film layers of different compositions comprising a first interference layer, a second interference layer and a first interface layer, successively formed in this order from the laser beam incident side of the recording layer, the thermal conductivity of the first interference layer being lower than that of the second interference layer, the refractive index of the second interference being smaller than that of any of the first interference layer and the recording layer, the first interface layer being provided in contact with the recording layer and between the second interference layer and the recording layer, the second interference layer containing oxygen, a protective layer having a smaller oxygen content than that of the second interference layer being provided between the second interference layer and the first interface layer, and the distance between the first interference layer and the recording layer being less than dg.

(2) An information recording medium for recording information by changes in at least one of atomic arrangement and electronic state by laser beam irradiation, which comprises at least a substrate having a groove shape with a groove depth dg, and a recording layer having a shape corresponding to the groove shape, and two thin film layers of different compositions comprising a first interference layer and a second interference layer, successively formed in this order from the laser beam incident side of the recording layer, the thermal conductivity of the fist interference layer being lower than that of the second interference layer, the refractive index of the second interference layer being smaller than that of any of the fist interference layer and the recording layer, the second interference layer containing oxygen, a protective layer having a smaller oxygen content than that of the second interference layer and containing the element as the element to be oxidized in the second interference layer being provided between the second interference layer and the recording layer, and the distance between the first interference layer and the recording layer is less than dg.

By providing the protective layer (oxygen barrier layer) between the second interference layer and the recording layer in this manner, oxidation of the recording layer by the oxygen diffused from the second interference layer can be controlled, and thus a distinguished information recording medium without overwriting deterioration due to many runs of overwriting, and without lowering of storage life can be manufactured at a low cost. By providing the first interface layer between the protective layer and the recording layer, as in (1), development of peeling defects between the protective layer and the recording layer can be controlled. The present inventors have further clarified that the thermal conductivity of compounds of low refractive index such as $SiO_2$, $Al_2O_3$, $MgO$, etc. used in the second interference layer is higher than that of the compound used in the first interference layer such as ZnS—SiO2, etc., so that the cross-erase phenomenon is liable top occur by heat diffusion into the adjacent tracks, as will be described in detail in the following embodiments. To avoid occurrence of such cross-erase phenomenon, the present inventors have clarified that the distance between the first interference layer and the recording layer must be less than the groove depth dg.

(3) An information recording medium as described in (2), characterized in that at least the second interference layer is composed of an oxide of any one element selected from Si, Al and Mg, or a mixture of oxides of Si, Al and Mg, and the protective layer is composed of a nitride of any one element selected from Si, Al and Mg, or a mixture of oxides of Si, Al and Mg.

By composing the second interference layer from oxides of Si, Al and Mg, the refractive index of the second interference layer can be effectively made as small as about 1.4–about 1.7, and thus the present information recording medium can be easily structured. As materials for the first interference layer, dielectrics of $(ZnS)_x(SiO_2)_{1-x}$ series (x=0.5–0.95) are most suitable because of higher refractive indice than those of the aforementioned oxides and lower thermal conductivity. By composing the protective layer from nitrides of Si, Al and Mg, the high absorption coefficient (absorbancy) can be made smaller and the protective layer having a smaller oxygen content than that of the second interference layer can be easily manufactured. Thus, the present information recording medium can be easily structured. As a result, the present information recording medium without any overwriting deterioration due to many runs of overwriting and without lowering of storage life can be manufactured at a low cost. Furthermore, by composing the protective layer from the nitride, the following merits can be obtained. Generally, the nitride has a high melting point and is thermally very stable. The nitride is also chemically stable, but the bond between metal and nitrogen is weaker in the bonding energy than the bond between metal and oxygen, and thus the nitride can be partly converted to an oxide. For example, even if excess oxygen is diffused from the second interference layer, the oxygen is trapped in the protective layer by replacement of the oxygen with nitrogen while diffusing through the protective layer. In that case, excess nitrogen is consequently generated, but the nitrogen, even if diffused into the recording layer, does not largely change the crystallization rate of the recording layer. As shown below, it is effective to use nitrogen oxides as materials for the second interference layer.

(4) An information recording medium as described in (2), characterized in that at least the second interference layer is composed of a nitrogen oxide of any one element selected from Si, Al and Mg, or a mixture thereof, and the protective layer is composed of a nitride of any one element selected from Si, Al and Mg or a mixture thereof.

In that case, there is such a problem that the refractive index is liable to become higher, as compared with the case of composing the second interference layer from a pure oxide such as $SiO_2$, $Al_2O_3$, MgO, etc., but such materials as $Si_2ON_2$, $SiAlO_2N$, $Si_3MgON_4$, etc. can be used for the second interference layer, because they can make the refractive index completely less than 2.0. In that case, even if excess oxygen is present in the nitrogen oxides, the excess oxygen is replaced with nitrogen in the second interference layer or in the protective layer before diffusion into the recording layer, and thus the excess oxygen hardly diffuses even into the recording layer. As shown below, unsaturated oxides of Si, Al and Mg can be used as materials for the protective layer.

(5) An information recording medium as described in (2), characterized in that at least the second interference layer is composed of an oxide of any one element selected from Si, Al and Mg, or a mixture thereof, and the protective layer is composed of an unsaturated oxide corresponding to the above-mentioned oxide or a mixture thereof, or any one element selected from Si, Al and Mg or a mixture thereof.

In that case, when the excess oxygen in the second interference layer diffuses through the protective layer, they are trapped therein by oxidizing Si, Al and Mg, and thus the oxygen hardly diffuses into the recording layer. Laser beam is more liable to be absorbed in the protective layer, but such absorption is optically negligible, so far as the thickness of the protective layer is made as large as 5 nm. Since the protective layer is composed of an unsaturated oxide, there is such a problem that unoxidized Si, Al and Mg diffuse through the first interface layer and directly diffuse into the recording layer. In that case, it is necessary to make the thickness of the first interface layer as large as, e.g. about 5 nm. When the thickness of the protective layer is too large, the oxygen barrier effect becomes preferable larger, but such problems as occurrence of a cross-erase phenomenon, lowering of reflectance, lowering of signal amplitude are encountered. However, the presence of the protective layer, though small in the thickness, can attain the barrier effect. Optimum thickness of the protective layer is 2 to 15 nm.

(6) An information recording medium as described in (1) or (2), characterized in that the thickness of at least the protective layer is 2 to 15 nm.

As described in the foregoing Section "Description of Related Art", when the protective layer is provided between the first interface layer and the second interference layer, as described above, there are a total of four thin layers on the laser beam incident side of the recording layer, and such increased number of layers is manufacturing-wise not preferable, but the substantial productivity can be increased by using the following methods.

(7) A method for manufacturing an information recording medium, characterized by comprising a step of forming a first interference layer on a substrate, a step of forming a second interference layer having a smaller refractive index than that of the first interference layer on the first interference layer by a sputtering method using an oxygen-containing sputter gas and a sputtering target, a step of forming a protective layer having a smaller oxygen content than that of the second interference layer on the second interference layer by a sputtering method using the sputtering target and a sputter gas containing less oxygen than the sputtering gas used for forming the second interference layer, and a step of forming a recording layer after the step of forming the protective layer.

(8) A method for manufacturing an information recording medium, characterized by comprising a step of forming a first interference layer on a substrate, a step of forming a second interference layer having a smaller refractive index than that of the first interference layer on the first interference layer by a sputtering method using an oxygen-containing sputtering gas and a sputtering target, a step of forming a protective layer having a smaller oxygen content than that of the second interference layer on the second interference layer by a sputtering method using the same sputtering target and a sputtering gas containing more nitrogen than the sputtering gas used for forming the second interference, and a step of forming a recording layer after the step of forming the protective layer.

(9) A method for manufacturing an information recording medium as described in (7) or (8), characterized in that said second sputtering target is a sputtering target composed of any one element selected from Si, Al and Mg or of a mixture of these elements.

(10) A method for manufacturing an information recording medium as described in (7) or (8), characterized in that said second sputtering target is a sputtering target composed of an oxide or an unsaturated oxide of any one of the elements selected from Si, Al and Mg or of a mixture thereof.

By the method as described above in (7) to (10), a distinguished information recording medium as described above in (1) to (6) can be manufactured at a low cost. It is not always necessary that the protective layer contains oxygen, and so far as the oxygen content of the protective layer is smaller than that of the second interference layer, the protective layer may be composed of e.g. a pure nitride. The nitrogen oxide so far mentioned herein means an oxide containing a nitride at least therein and at the same time means a nitride containing an oxide at least therein. The unsaturated oxide so far mentioned herein means an oxide deficient in oxygen as compared with the stoichiometric composition.

The aforementioned protective layer, first interface layer, recording layer, etc. are usually very thin, e.g. a few nm. In that case, they are not always in a layer state, but such a phenomenon that they are in an island state (spotted state) occurs. Even in that case, so far as the distance between the island-state thin layers is about 1/10 of the laser beam wavelength, the island state can be optically negligible, and the effect of the present invention will not be lost even in the presence of an island-state thin layer having the average thickness. The main purpose of the first interface layer is to prevent peeling between the protective layer and the recording layer, and thus even if the first interface layer is in an island state, the island state is into objectionable at all, when materials used in the protective layer are hardly diffuse into the recording layer. When the second interference layer and the protective layer are formed by the reactive sputtering method, as mentioned above, a discrete interface is sometimes hardly established between the second interference layer and the protective layer. That is, there is sometimes such case that the oxygen content is continuously changed from the second interference layer to the protective layer, but the effect of the present invention is not lost at all in such a case.

The present information recording medium will be described in detail below, referring to the drawings.

Information Recording Medium

FIG. 1 shows the basic structure of the present information medium. The first information recording member is in a structure of substrate 1-1 provided with groove-shaped information tracks, and a first interference layer 1-2, a second interference layer 1-3, a protective layer (oxygen barrier layer) 1-4, a first interface layer 1-5, a recording layer 1-6, second interface layer 1-7, a third interface layer 1-8, a thermal buffer layer 1-9 and a heat diffusion layer 1-10 successively formed in this order. A second information recording member in the similar structure is pasted to the first information recording member as mentioned above through adhesive 1-11.

For substrate 1-1, a transparent substrate made of a plastic such as polycarbonate, etc. is used. Usually, the transparent substrate has a refractive index of about 1.5–1.6. Satisfactory optical requirements for the first interference layer is that the refractive index is higher than that of said substrate 1-1, desirably not less than 2.0, whereby light reflection takes place between substrate 1-1 and first interference layer 1-2, and changes in reflectance between unrecorded portions (crystalline state) and recorded portions (amorphous state) can be increased by the optical interference effect based on the reflection. It is also important that the refractive index of second interference layer 1-3 is lower than that of first interference layer 1-2 and is also lower than that of recording layer 1-6. Oxygen barrier layer 1-4 is indispensable for preventing oxygen diffusion from second interference layer 1-3 to recording layer 1-6. First interface layer 1-5 is indispensable for controlling occurrence of peelings mainly between recording layer 1-6 and oxygen barrier layer 1-4. It is desirable that the refractive index of first interface layer 1-5 is made as equal to that of second interference layer 1-3 as possible, but when the refractive index becomes as high as that of first interference layer 1-2, it is better to make first interface layer as thin as possible within such a range as not to affect the aforementioned peeling control effect. Third interference layer 1-8 must have an appropriate thickness for controlling occurrence of a cross-erase phenomenon, while making heat diffusion layer 1-8 and recording layer 1-6 apart from each other in an appropriate distance. The thickness is at least 35 nm, desirably not less than the groove depth dg. It is required that the thermal conductivity is appropriately low. Second interference layer 1-7 plays a role of controlling occurrence of peeling mainly between recording layer 1-6 and third interference layer 1-8 and also of controlling diffusion of elements of the third interference layer to the recording layer. Thermal buffer layer 1-9 plays a role of controlling absorbance when recording layer 1-6 is in a crystalline state and absorbance when in an amorphoses state, and also of controlling heat flow from recording layer 1-6 to heat diffusion layer 1-10 at the same time. Materials with optical constants (n, k) in ranges of 1.4<n<4.5 and −3.5<k<0.5, particularly 2<n<4 and −3.0<k<−0.5, are desirable. Heat diffusion layer 1-10 plays a role of rapidly diffusing the heat generated in recording layer 1-6, thereby controlling the thermal damage of recording layer 1-6 at the time of overwriting. Thus, an appropriately high thermal conductivity is required, and consequently it is necessary that the thickness is at least 30 nm.

The present invention will be described below from the optical aspect. For simplicity, description will be made below, limiting only to optically very important first interference layer, second interference layer, recording layer, third interference layer and heat diffusion layer.

Figure 2A:
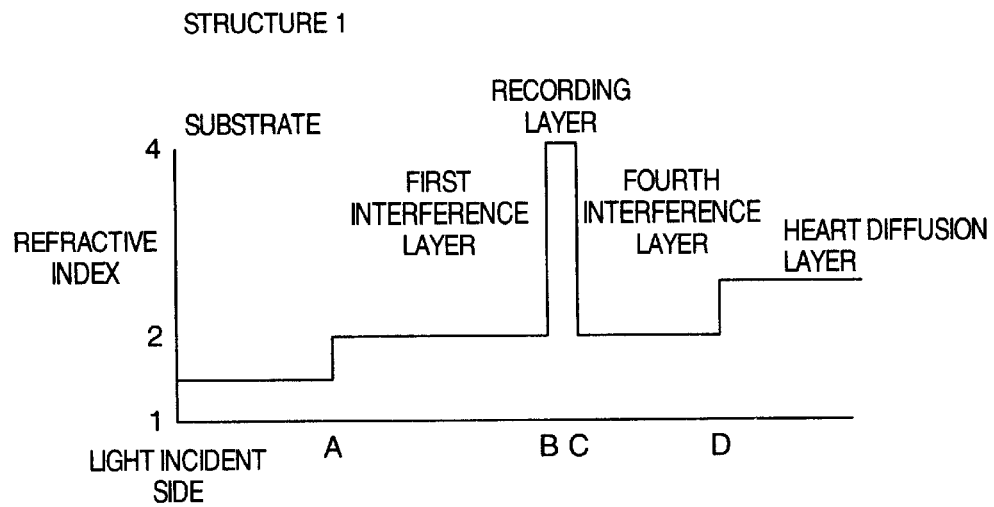
FIGS. 2A and 2B each are a view schematically showing the refractive indice of the individual layers including the second interference layer (FIG. 2A) and excluding the second interference layer (FIG. 2B).
Figure 2B:
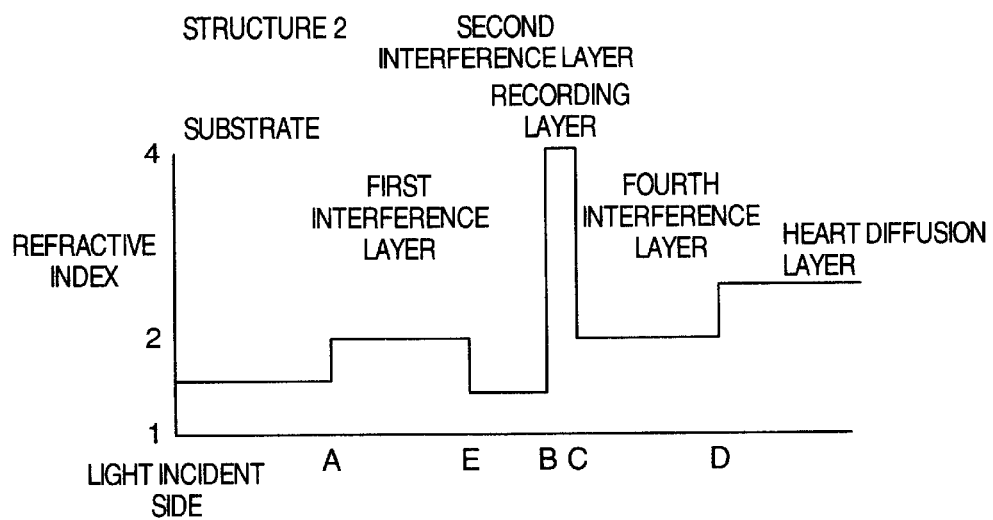

FIGS. 2A and 2B each are a view schematically showing the refractive indice of the individual layers excluding the second interference layer (FIG. 2A) and including the second interference layer (FIG. 2B), where the axis of ordinate shows a refractive index, whereas the axis of abscissa shows a distance in the light incident direction from a given point on the substrate.

Structure 1 as shown in FIG. 2A is such a structure that the first interference layer, the recording layer, the third interference layer and the heat diffusion layer are successively formed in this order on the substrate. In that structure, optical design is made on the basis of the multiplex interference effect mainly on the basis of 4 reflective planes, that is, reflective plane A between the substrate and the first interference layer, reflective plane B between the first interference layer and the recording layer, reflective plane between the recording layer and the third interference layer and reflective plane D between the third interference layer and the heat diffusion layer. In that case, optical paths used in the optical design are 6 paths of A–B, A–C, A–D, B–C, B–D and C–D. On the other hand, when the second interference layer having a lower refractive index than that of the first interference layer is provided between the first interference layer and the recording layer (Structure 2 as shown in FIG. 2B), reflective plane e, new in the multiplex interference, can be further added thereto. In that case, the light paths used in the optical design are 10 paths of A–B, A–C, A–D, A–E, B–C, B–D, B–E, C–D, C–E and D–E, where freedom of optical design are largely increased. On the basis of effective reflection on reflective plane e, it is easy to improve the reflectance.

It is preferable that the refractive index of the second interference layer is lower than that of the first interference layer for the following two reasons.

The refractive index of the substrate depends on selected materials to satisfy various properties required for the substrate, and is about 1.5–1.6. Thus, to increase the reflectance on reflective plane a, the refractive index of the first interference layer must be made either as low as possible or as high as possible. In view of the fact that the refractive index of ordinary inorganic dielectrics applicable to the first interference layer is about 1.4 at the minimum, it is not practical that the refractive index of the first interference layer is made lower. That is, the refractive index of the first interference layer must be made extremely higher than that of the substrate. However, usually materials having a refractive index of not less than 2.5 can easily absorb light, and thus the refractive index of the first interference layer is practically limited to about 2–2.2. Likewise, to increase the reflectance on reflective plane e, the refractive index of the second interference layer is made higher or lower than that of the first interference layer. When the refractive index of the second interference layer is made higher than that of the first interference layer, two problems are encountered. The first problem is that it is very difficult to obtain a transparent material having a refractive index of not less than 3. The second problem is that the difference in the refractive index between the recording layer (refractive index: about 4) and the second interference layer becomes smaller, resulting in a decrease in the reflectance on reflective plane b. Thus, it is preferable the refractive index of the second interference layer is lower than that of the first interference layer. The first interface layer is indispensable for controlling occurrence of peeling mainly between the recording layer and the second interference layer. It is desirable that the refractive index of the first interface layer is approximately equal to that of the second interference layer, but when it is nearly as high as that of the first interference layer, it is preferable that the thickness is as small as possible within such a range as not to affect the aforementioned peeling control effect.

Results of optical calculation will be shown below.

First interference layer: (2.16, 0.00)

Second interference layer: (1.4–2.2, 0.00)

First interface layer: (2.6, −0.09)

Recording layer (crystalline): (4.57, −5.46)

Recording layer (amorphous): (4.51, −2.22)

Second interface layer: (2.6, −0.09

Third interference layer: (2.16, 0.00)

Thermal buffer layer: (4.09, −2.88)

Heat diffusion layer: (1.84, −5.74)

Thickness of the individual layers are shown below:

First interference layer: 0–150 nm

Second interference layer: 0–80 nm

First interface layer: 1 nm

Recording layer: 6.3 nm

Second interface layer: 1.0 nm

Third interference layer: 45 nm

Thermal buffer layer: 35 nm

Heat diffusion layer: 60 nm

Figure 3:
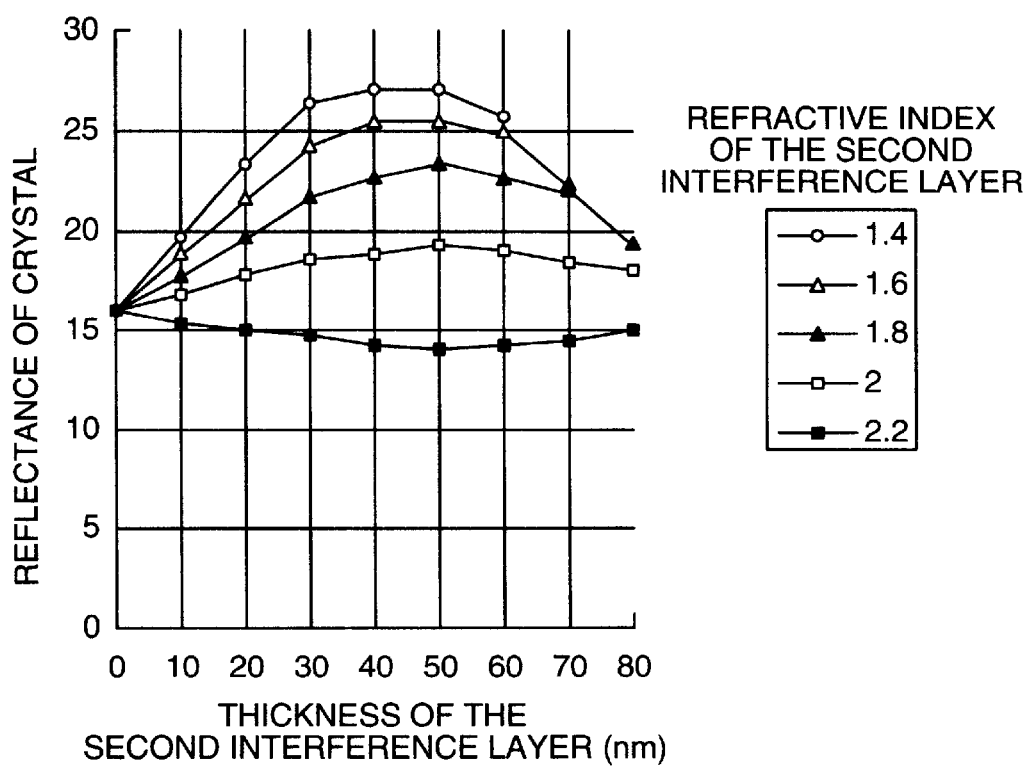
FIG. 3 is a diagram showing another calculation example of the present invention.

FIG. 3 shows results of calculation when the thickness of the first interference layer is optimized so that a ratio of reflectance Rc of crystalline state material to reflectance Ra of amorphous state material, i.e. (Rc-Ra)/Rc, can be not less than 90%, using the thickness and refractive index of the second interference layer as variables. When the refractive index of the second interference layer is higher than that of the first interference layer (n=2.2), the reflectance of crystalline state material will be lowered, if the thickness of the second interference layer is more than 0 (i.e. if there is the second interference layer), but when the refractive index of the second interference layer is lower than that of the first interference layer (i.e. less than 2.0), the reflectance will be effectively increased. The desired reflectance is not less than 15%, as described in 4.7 GBDVD-RAM Specification. In the present calculation, the effects of reflection of laser beam on the substrate surface, etc. are not taken into account and thus the results of the present calculation involves a substantial allowance of about 4%. That is, in the present calculation the desired reflectance is not less than 19%. The refractive index of the second interference layer, which satisfies this condition, is 1.4–1.8. However, even if the refractive index of the second interference layer is any value of 1.4–1.8, the aforementioned condition can be satisfied, so long as the thickness of the second interference layer is 20–78 nm. Thus, at least the refractive index of the second interference layer is lower than that of the first interference layer, desirably not more than 1.8, and the thickness is preferably 20–78 nm. The aforementioned ranges of thickness and refractive index are directed to the case of desired reflectance of 19%, but practically in view of the in-plane uniformity of optical discs, mass production yield, etc. it is necessary to give the reflectance a further substantial allowance of about 3%. Thus, the desired reflectance will practically result in 22% or more. In that case, the desired reflectance can be satisfied so long as the refractive index of the second interference layer is 1.4–1.6 and the thickness is 20–70 nm.

Figure 4:
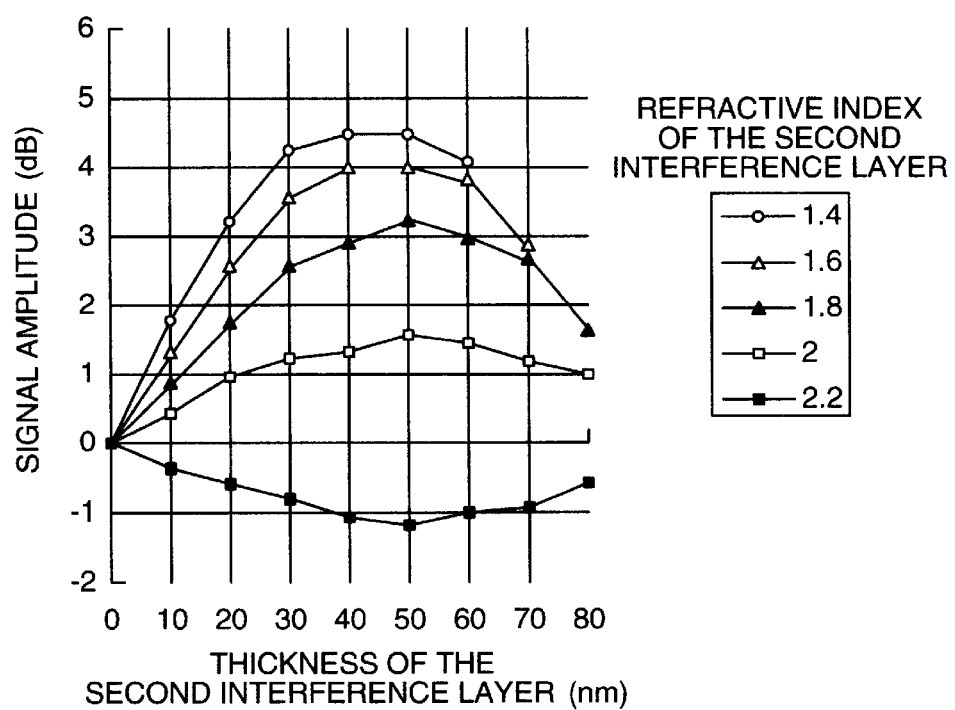
FIG. 4 is a diagram showing one calculation example of the present invention.

FIG. 4 shows results of calculation of dependency of read signals on the thickness and refractive index of the second interference layer, when the thickness of the first interference layer is optimized so that the reflectance Rc of crystalline state material can be 205 or more. When the refractive index of the second interference layer is higher than that of the first interference layer (n=2.2), read signal amplitude will be decreased, if the thickness of the second interference layer is more than 0.0 (i.e. if there is the second interference layer), but when the refractive index of the second interference layer is lower than that of the first interference layer (i.e. less than 2.0), the read signal amplitude can be effectively improved. Particularly, when the thickness of the second interference layer is 20 nm or more, the read signal amplitude can be effectively improved by 1 dB or more, even if the refractive index is 2.0. The optimum thickness of the second interference layer is about 45 nm±25 nm. Thus, it is preferable that at least the refractive index of the second interference layer is lower than that of the first interference layer and the thickness is 20 nm or more. Particularly when the refractive index of the second interference layer is 1.8 or less and the thickness is 20 nm–78 nm, the read signal amplitude can be improved by 2 dB or more.

Figure 5:
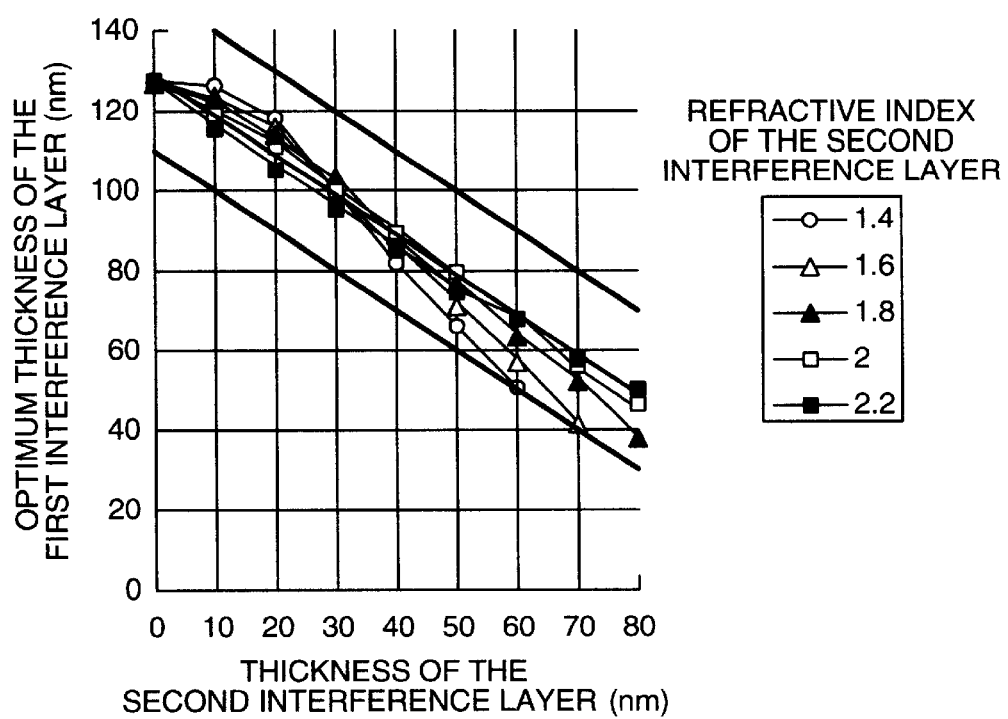
FIG. 5 is a diagram showing another calculation example of the present invention.

FIG. 5 is a diagram showing relations between the thickness and the refractive index of the second interference layer, and the optimum thickness of the first interference layer at the time of calculation for FIG. 3. Suitable sum total of the thickness of the first interference layer and that of the second interference layer is 130±20 nm, and the optimum thickness falls particularly in a range of 130±10 nm. It is important to maintain these relations.

The foregoing calculation has been made on the basis of read laser wavelength of 660 nm. When, for example, other read laser of other wavelength is used, it is preferable that the thickness of the second interference layer is approximately $\lambda/40–\lambda/0$, desirably approximately $\lambda/30–\lambda/10$. It is further preferable that the sum total of the thickness of the first interference layer and that of the second interference layer is approximately $\lambda/5±\lambda/3$, desirably approximately $\lambda/5±\lambda/60$.

As described in detail above, the refractive index and the thickness of the second interference layer are very important. It is particularly preferable that the first interference layer has a higher refractive index than that of a material present in contact with at least the laser beam incident side of the first interference layer. Usually, the material present in contact with the laser beam incident side of the first interference layer is a substrate of plastic such as polycarbonate, etc. The refractive index of the material is approximately 1.4–1.6. To effectively reflect the light between the aforementioned organic material and the first interference layer, the refractive index of the first interference layer is desirably 2.0 or more. Specifically, from the viewpoint of attaining a high refractive index, i.e. 2.0 or more and a high film-forming rate without noise generation, a mixture of ZnS and $SiO_2$ is preferable. Particularly, the mixture having a Zns content of 50–95% is preferable. It is also required that the refractive index of the second interference layer is less than 2.0, desirably 1.8 or less. Specifically, it is desirable that the second interference layer comprises an oxide of low refractive index such as $SiO_2$, $Al_2O_3$ and MgO from the viewpoint of very low refractive index of the second interference layer.

The role of the oxygen barrier layer will be described in detail below.

As already described above, the present inventors have clarified that oxygen in the second interference layer comprising the aforementioned oxide of low refractive index oxidizes the recording layer materials, and when stored for a long time or subjected to about 10,000 runs of overwriting the read signal quality is deteriorated. The first interface layer is provided between the second interference layer and the recording layer, but the thickness of the first interface layer must be inevitably very small (e.g. approximately 0.5–2.0 nm) mainly due to optical reasons. The first interface layer is so thin that the oxygen in the second interference layer can easily reach the recording layer. Particularly, when the second interference layer is made from $SiO_2$, $Al_2O_3$ and MgO by a reactive sputtering method using a metal such as Si, Al and Mg and oxygen, the oxygen in the sputtering gas remains as not fully reacted in the second interference layer. Depending on the film-making conditions, to attain complete reaction of a metal such as Si, Al, Mg, excess oxygen inevitably remains in the second interference layer. By diffusion the of oxygen into the recording layer, the crystallization rate of the recording layer is lowered, resulting in such a problem that the already recorded record mark is not fully erased. Such oxygen diffusion further progresses by heat generated when subjected to many runs of overwriting or by long-term storage, resulting in deterioration of read signals after many runs of overwriting and lowering of storage life.

The essential of the present invention is to newly provide an oxygen barrier layer between the second interference layer and the first interface layer to control the aforementioned oxygen diffusion.

The oxygen barrier layer will be described in detail below.

By making the oxygen barrier layer from nitrides of Si, Al and Mg, an oxygen barrier layer having a low light absorption coefficient (absorbancy) and a smaller oxygen content than that of the second interference layer can be easily formed. That is, the present information recording medium can be easily structured. As a result, the present information recording medium without overwriting deterioration after many runs of overwriting and lowering of storage life can be manufactured at a low cost.

The following merits result from making the oxygen barrier layer from nitrides. Generally, nitrides have a high melting point and are thermally very stable. Furthermore, nitrides are also chemically stable, but the bond between the metal and the nitrogen is weaker in the bonding energy than the bond between the metal and the oxygen, and thus the nitrides can be partly converted to oxides. For example, even if excess oxygen in the second interference layer diffuses, replacement of the diffused oxygen with nitrogen takes place while diffusing through the oxygen barrier layer. Thereby trapping the oxygen in the oxygen barrier layer. In that case, excess nitrogen evolves, but the evolved nitrogen, even if diffused into the recording layer, will not largely change the crystallization rate of the recording layer.

It is also effective to use nitrogen oxides for the second interference layer. In that case, there is such a problem that the refractive index is liable to be higher than that of pure oxides such as $SiO_2$, $Al_2O_3$ and MgO. For example, materials such as $Si_2ON_2$, $SiAlO_3N$, $Si_3MgON_4$, etc. can lower the refractive index to less than 2.0 and thus can be used for the second interference layer. In that case, even if there is excess oxygen in these nitrogen oxides, the excess oxygen is replaced with nitrogen in the second interference layer or in the oxygen barrier layer before diffusion into the recording layer, and thus the excess oxygen hardly diffuses into the recording layer.

Unsaturated oxide of Si, Al and Mg can be used for the oxygen barrier layer. In that case, excess oxygen in the second interference layer, while diffusing through the oxygen barrier layer, is trapped therein by oxidizing Si, Al and Mg, and thus the oxygen hardly diffuses into the recording layer. Laser beam is easily absorbed into the oxygen barrier layer, but such absorption is negligible so long as the thickness of the oxygen barrier layer is 5 nm or less. Since the oxygen barrier layer comprises unsaturated oxides, there is such a problem that the unoxidized Si, Al and Mg sometimes diffuses through the first interface layer and directly into the recording layer, where it is necessary to make the thickness of the first interface layer as large as about 5 nm.

The following method is effective for manufacturing the above-mentioned information recording medium.

The difference between the oxygen barrier layer and the first interface layer is in the adhesiveness. One of the most important properties required for the first interface layer is improved adhesiveness between the recording layer and other layers than the recording layer, whereas the adhesiveness is not so required for the oxygen barrier layer as for the first interface layer. In the case of the first interface layer, oxides are used because of the small thickness, but in the case of the oxygen barrier layer, pure oxides cannot be used. Even in the case that oxides are to be contained, it is necessary that the oxides are in mixture of nitrides (nitrogen oxides) or to use unsaturated oxides such as SiO, AlO, etc. of incomplete oxidation degree.

By making the thermal conductivity of the first interference layer lower than that of the second interference layer and making the distance between the first interference layer and the recording layer less than the groove depth dg, occurrence of the cross-erase phenomenon can be further controlled for the following reasons.

To control occurrence of the cross-erase phenomenon, it is very important to make less the heat flow toward the adjacent tracks.

Figure 6:
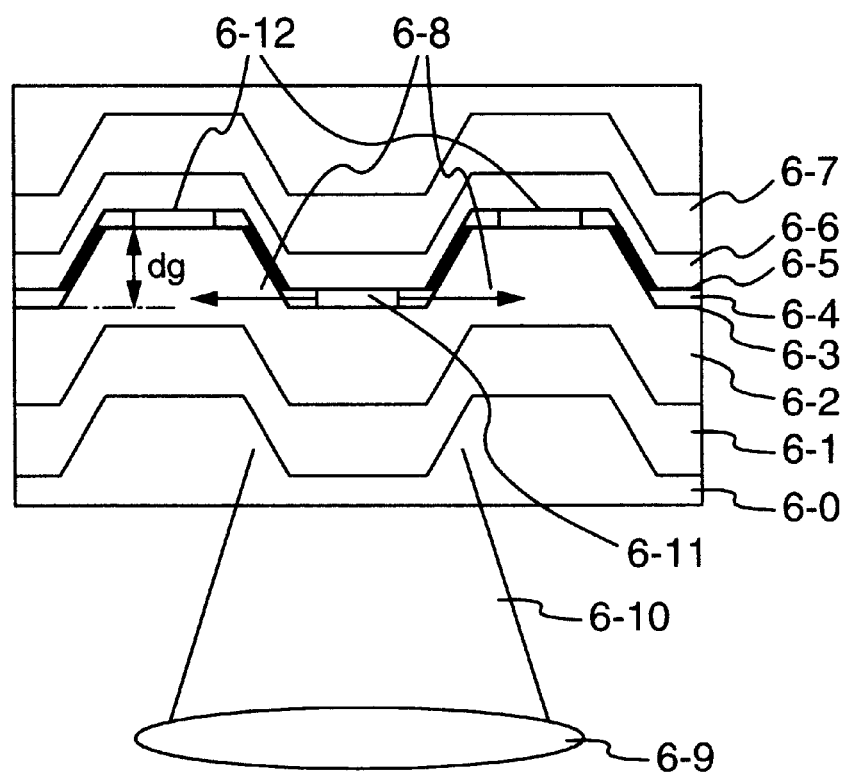
FIG. 6 shows a conceptual structure for explaining the principle of the present invention.
Figure 7:
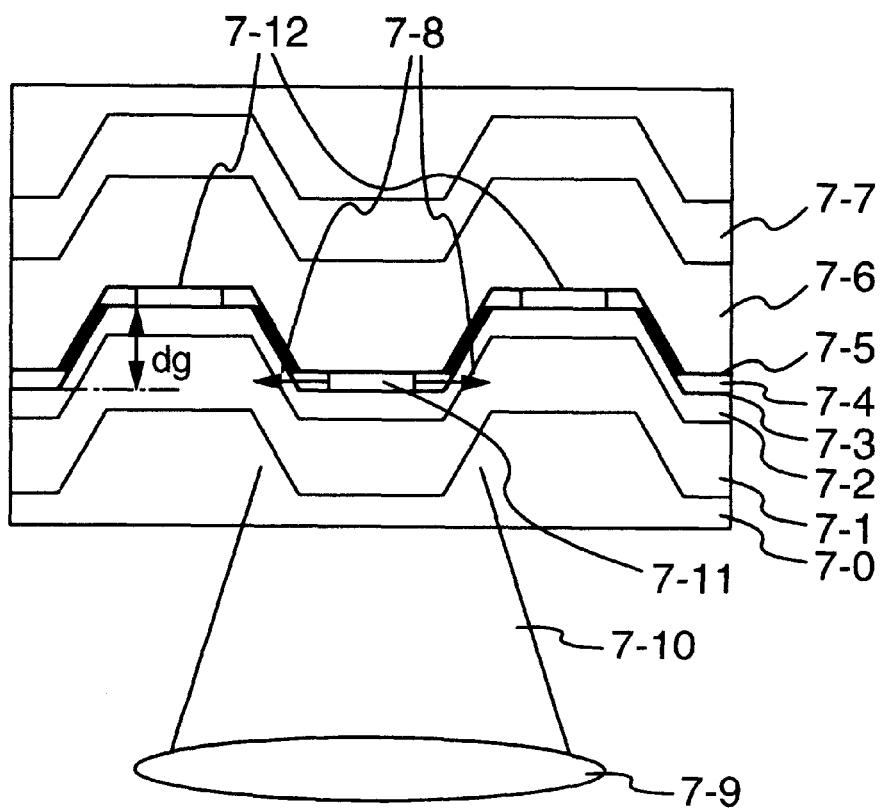
FIG. 7 shows another conceptual structure for explaining the principle of the present invention.

FIG. 6 shows heat flow 6-8 at recording on grooves when the thermal conductivity of second interference layer 6-2 is higher than that of first interference layer 6-1 and the distance between first interference layer 6-1 and recording layer 6-4 is not less than the groove depth dg. In that case, there is second interference layer 6-2 having a higher thermal conductivity mainly toward the adjacent tracks to heat source on groove 6-11. Thus, heat is liable to diffuse toward the adjacent tracks, resulting in occurrence of the cross-erase phenomenon. When the thermal conductivity of first interference layer 7-1 is lower than that of second interference layer 7-2 and the distance between first interference layer 7-1 and recording layer 7-4 is less than the groove depth dg, on the other hand, first interference layer 7-1 having a low thermal conductivity mainly exists in the direction toward the adjacent tracks to heat source on groove 7-11, as shown in FIG. 7. Thus, heat flow 7-8 is made smaller, thereby controlling occurrence of the cross-erase phenomenon. In this manner, heat flow 7-8 toward the adjacent tracks to heat source on groove 7-11 very largely depends on the distance between first interference layer 7-1 and recording layer 7-4.

The foregoing description has been made of the heat flow from the grooves toward the land at the time of recording on grooves, but the thickness of the third interference layer is important for controlling the heat flow from the lands toward the grooves, as will be described in detail below, referring to FIGS. 6 and 7. When the thermal conductivity of heat diffusion layer 6-7 is higher than that of third interference layer 6-6 and the distance between heat diffusion layer 6-7 and recording layer 6-4 is less than the groove depth dg (FIG. 6), heat diffusion layer 6-7 mainly exists in the direction toward the adjacent tracks to heat source on land 6-12, and thus heat is liable to flow toward the adjacent tracks. On the other hand, when the thermal conductivity of heat diffusion layer 7-7 is higher than that of second interference layer 7-6 and the distance between heat diffusion layer 7-7 and recording layer 7-4 is not less than the groove depth dg, third interference layer 7-6 having a low thermal conductivity mainly exists in the direction toward the adjacent tracks to heat source on land 7-12, as shown in FIG. 7, and thus heat hardly flows toward the adjacent tracks. As a result, occurrence of the cross-erase phenomenon can be controlled.

In FIGS. 6 and 7, 6-0 and 7-0 each show a substrate, 6-3 and 7-3 each show an oxygen barrier layer, 6-5 and 7-5 each show a second interface layer, 6-9 and 7-9 each show an object lens, and 6-10 and 7-10 each show a laser beam.

Thus, dielectrics having a thermal conductivity of not more than 2 W/mk and a refractive index of not less than 2 are suitable for the first interference layer and the third interference layer of the present information recording medium. For example, a mixture of ZnS and $SiO_2$ is preferable from the viewpoint of extremely low thermal conductivity. Particularly, the mixture having a Zns content of 50–95% is more preferable. Particularly, the mixture having a ZnS content of 70–90% is most preferable, because the refractive index can be made as low as 2–2.2 and the thermal conductivity can be made as low as approximately 0.4–0.5 w/mk.

Oxides having a low refractive index are optically suitable for the second interference layer of the present information recording medium. Particularly when such oxides having a low refractive index as $SiO_2$, $Al_2O_3$, MgO, etc. are used, the thermal conductivity will be very large (e.g. approximately 2–11 W/mk). In that case, occurrence of the cross-erase phenomenon can be effectively controlled by making the distance between the recording layer and the first interference layer less than the groove depth dg.

Metals having a high thermal conductivity, but a high reflectance in the case of the absence of the thermal buffer layer as shown in FIGS. 6 and 7, such as Al, An, Ag, etc., or alloys containing these metals are suitable for the heat diffusion layer of the present information recording medium.

In FIGS. 6 and 7, the first interface layer and the thermal buffer layer are not shown. In the foregoing, description has been made mainly on the thermal conductivity of the first interference layer and the second interference layer, and also on the thermal conductivity of the third interference layer and the heat diffusion layer. In the present information recording medium, the thickness each of the oxygen barrier layer and the first interface layer are extremely small (e.g. not more than 5 nm), and thus the thermal conductivity of these layers is neglibly small.

Information Write-read Apparatus

Figure 8:
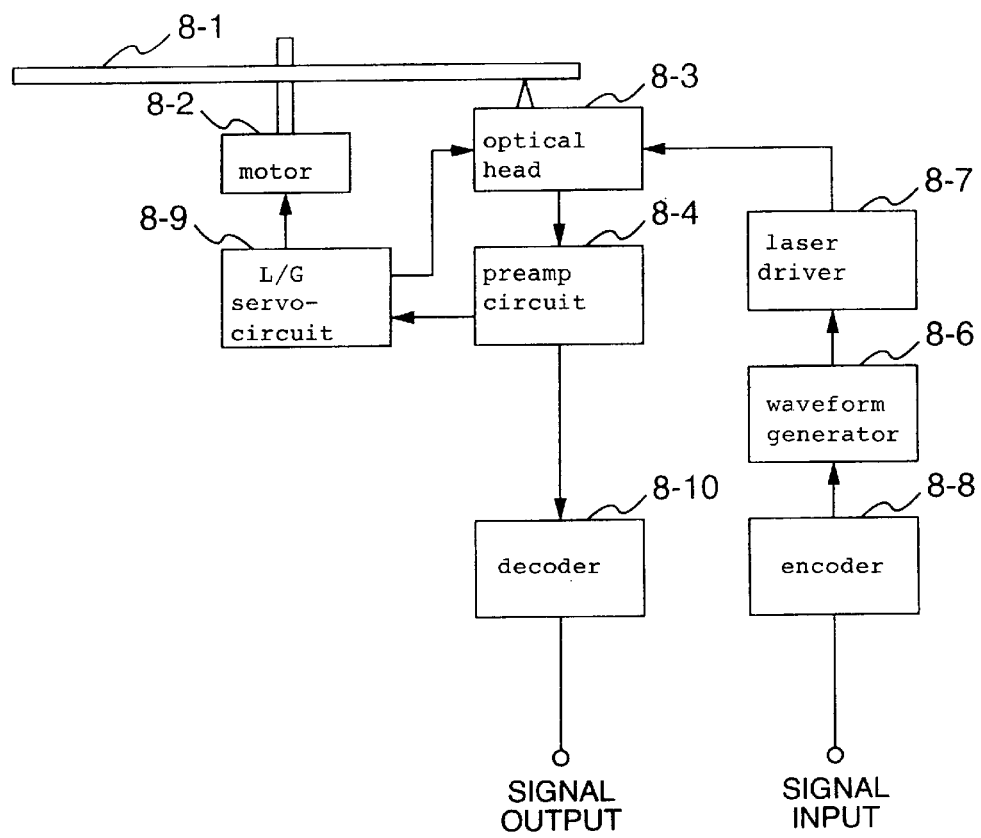
FIG. 8 is a block diagram of an information recording medium used in one embodiment of the present invention.

The working of an information write-read apparatus used for evaluating read signals of the present information recording medium will be described in detail below, referring to FIG. 8, where a ZCLV (Zone Constant Linear Velocity) system capable of changing the rpm of a disc in each write-read zone is used as a motor control method for the write-read operation.

Information from the outside of the recording apparatus is transferred to 8-16 encoder 8-8 with 8 bits as a unit. When information is to be recorded on information recording medium 8-1 (which will be hereinafter referred to as "optical disc"), recording is carried out by an encoding system of converting 8-bit information to 16-bit one, so called 8-16 encoder system. In the encoder system, information of mark length of 3T–14T corresponding to the 8-bit information is recorded on the medium. In FIG. 8, 8-16 encoder 8-8 performs such an encoding. "T" herein referred shows a clock period at the time of information recording and means 17.1 ns.

Digital signals of 3T–14T encoded by 8-16 encoder 8-8 is transferred to recording waveform generator 8-6, where a multi-pulse recording waveform capable of laser irradiation of intermediate power level between a series of high power pulses having a pulse width of about T/2 can be formed by laser irradiation of a low power level of about T/2 between high power level laser irradiations. To form record works, the high power level of 10.0 mW and the intermediate power level of 4.0 mW capable of erasing the record marks are used. In said recording waveform generator 8-6, signals of 3T–14T are made to correspond "o" and "1" alternately in time series, and at "0" on intermediate power level laser beam is to be irradiated whereas at "1" a series of high power pulse laser beams including a high power level pulse laser is to be irradiated. The portions irradiated with the intermediate power level laser beam on optical disc 1 become crystalline (space portions), whereas portions irradiated with a series of high power pulse laser beams including a high power level pulse laser beam become amorphous (mark portions). Said recording waveform generator 8-6 has a multipulse waveform table corresponding to a system of changing the head pulse width and the tail pulse width of the multipulse waveform according to the space length between the mark portions at the time of forming a series of high power pulses including a high power level for forming the mark portions (adaptive recording waveform control), thereby generating a multipulse recording waveform extremely free from the influence of intermark thermal interferences generated between the mark portions.

Recording waveform generated in recording waveform generator 8-6 is transferred to laser driver 8-7. Laser driver 8-7 makes the semiconductor laser in optical head 8-3 emit on the basis of the recording waveform.

In optical head 8-3 provided in the recording apparatus, a semiconductor laser having a light wavelength of 655 nm is used as an information-recording laser beam. The laser beam is focused on the recording layer on said optical disc 8-1 by an object lens of NA 0.6, and information is recorded thereon by irradiation with a laser beam corresponding to the recording waveform.

Generally, when a laser beam having a laser wavelength $\lambda$ is focused by a lens of a numerical apparature (NA), the spot diameter of the laser beam will be $0.9 \times \lambda/NA$. Thus, the spot diameter of laser beam is about 0.98 $\mu$m under the aforementioned conditions, where the polarization of the laser beam, which takes place at the same time is deemed to be circular polarization.

The recording apparatus corresponds to a system of recording information both on grooves and lands (areas between the groves) (so-called land-groove recording system). In the recording apparatus, tracking to lands or grooves can be selected as desired by L/G servo circuit 8-9.

Reading of the recorded information is carried out by said optical head 8-3. Read signals can be obtained by irradiating the record marks with a laser beam and detecting reflected light from the marks and other portions than the marks. The amplitude of the read signals is increased by preamplitude circuit 8-4 and transferred to 8-16 decoder 8-10. 8-16 decoder 8-10 acts to convert 16-bit information to 8-bit information by each 18 bits. Through the aforementioned working reading of record marks can be attained. When recording is carried out on said optical disc 6-1 under the aforementioned conditions, the mark length of the shortest mark i.e. 3T mark, is about 0.42 $\mu$m, whereas the mark length of the longest mark, i.e. 14T mark, is about 1.96 $\mu$m.

Sputtering Apparatus

Structure of a sputtering apparatus for use in the manufacturing of the present information recording medium will be described in detail below.

So called single wafer sputtering apparatus comprising a plurality of chambers, each of which is provided with a sputtering target, a substrate for a information recording medium being successively transferred from one chamber to another is suitable for the sputtering apparatus for manufacturing the present information recording medium. The sputtering apparatus is provided with total 12 chamber, among of which 9 chambers are process chambers for use in the process for making a film, two chambers are cleaning chambers for use in preventing substrate deformation due to substrate heating during the sputtering, and one chamber is a load-lock chamber for transferring a substrate to the sputtering apparatus and discharging the film-formed substrate from the sputtering apparatus.

The process chambers are each provided with a power supply for sputtering suitable for forming a film, a plurality of sputtering gas pipings, mass flow controllers for controlling sputtering gas flow rates, etc. When substrates are set in the individual chambers, sputtering gases suitable for the individual chambers are introduced into the individual chambers, and then sputtering is carried out in the individual chambers. The present inventors have found a method for forming the second interference layer and an oxygen barrier layer in a single chamber by successively introducing a plurality of sputtering gases into the single chamber. For example, an Ar+$O_2$ gas is used as a sputtering gas for forming the second interference layer and an Ar+$N_2$ gas is used for forming the oxygen barrier layer, whereby a number of chambers can be reduced and thus the cost pertaining to the sputtering apparatus can be reduced. By using such a reactive sputtering method, films of dielectrics such as $SiO_2$, $Al_2O_3$, MgO, etc. can be made with an electroconductive target such as Si, Al, Mg, etc. and thus power supply for sputtering can be shifted from a relatively expensive RF (high frequency) power source to DC (direct current) power source.

The cleaning chamber is provided with a cooling plate for cooling the substrate and a gas piping for introducing a He gas for releasing the heat of the substrate to the cooling plate into the cleaning chamber.

Carriers for transferring substrates are each provided with a small vacuum motor for rotating the substrates. Power source cables are not used for power sources for the motor, and thus when the carriers are to be set in the individual chambers, it is taken into consideration to supply power from the contact parts with the individual chambers. By substrate rotation, uniformity in composition and thickness of the individual layers formed on the substrate can be largely improved.

Figure 9:
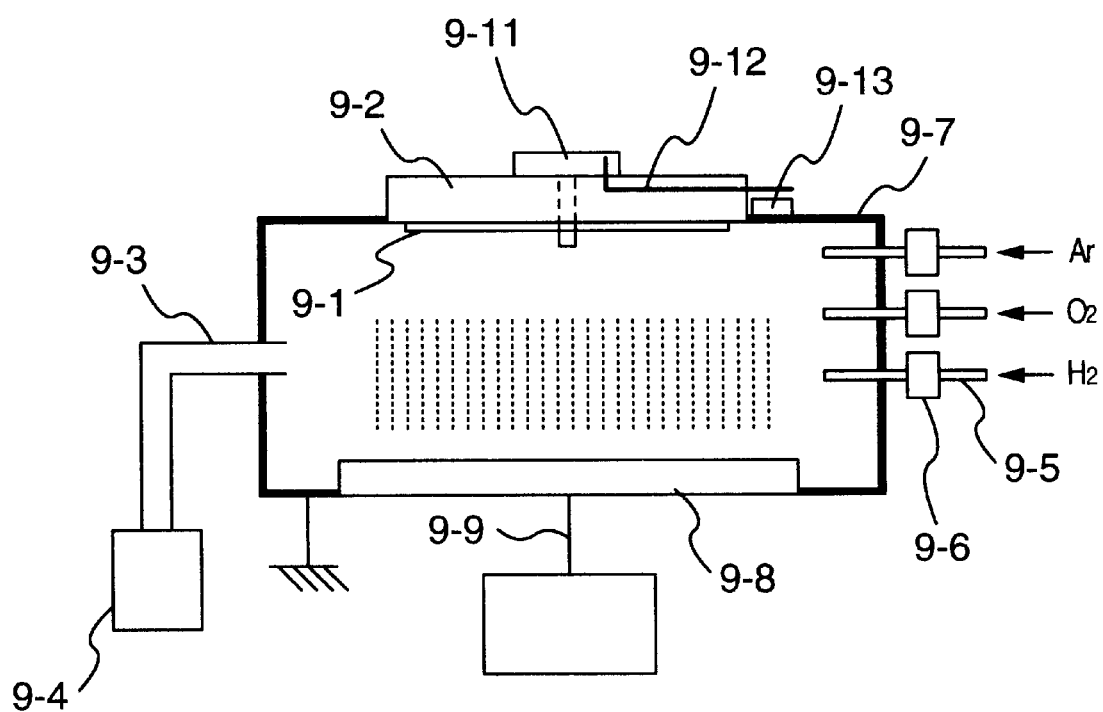
FIG. 9 shows a structural view of a sputtering apparatus used in the present invention.

FIG. 9 is one embodiment of a chamber in the sputtering apparatus for use in a method for manufacturing the present information recording medium. Chamber 9-7 is evacuated by vacuum pump 9-4 through exhaust pipe 9-3. Chamber 9-7 is provided with three sputtering gas pipings 9-5, through which an Ar gas, an oxygen gas and a nitrogen gas are separately supplied to chamber 9-7 at desired flow rates by individual mass flow controllers 9-6. Chamber 9-7 is also provided with a sputter target 9-8, to which a voltage is applied from power supply for sputtering 9-10.

At the same time when substrate 9-1 is transferred into the sputtering apparatus, substrate 9-2 is mounted on carrier 9-2 and successively traveled from one sputtering chamber to another. Carrier 9-2 is provided with motor 9-11 for rotating substrates and power transmittance for motor 9-12. When carrier 9-2 is mounted on chamber 9-7, an electric current is supplied to motor for rotating substrates 9-11 from power supply for motor 9-13 mounted on chamber 9-7 through power transmittance for motor 9-12. At the same time, substrate 9-1 is rotated.

For example, in the case of forming the second interference layer and the oxygen barrier layer, using a single target, it is preferable to form layers according to the following process. At first, only an Ar gas and an oxygen gas are introduced into chamber 9-7. A voltage is applied to sputtering target 9-8 from power supply for sputtering 9-10 to make electric discharge take place over sputter target 9-8. For example, in the case that the material of sputtering target is Si, a $SiO_2$ layer is formed on substrate 9-1 through this process. By controlling the oxygen flow rate by mass flow controller 9-6 at that time, composition ratio of Si to oxygen in the formed layer can be controlled.

In the case of forming the oxygen barrier layer, only an Ar gas and a nitrogen gas are introduced into chamber 9-7. Voltage is applied to sputtering target 9-8 from the power supply for sputtering 9-10 to make electric discharge take place over sputtering target 9-8. For example, in the case that the material of sputtering target is Si, a $Si_3N_4$ layer is formed on substrate 9-1 through the process. By controlling the nitrogen flow rate by mass flow controller 9-6 at that time, a composition ratio of Si to N in the formed layer can be controlled. However, since oxides of Si are formed on the surface of Si target during forming the second interference layer, depending on sputtering power and sputtering gas flow rate, nitrogen oxides such as SiON, etc can be also formed sometimes even in the case of using only the Ar gas and the nitrogen gas. When a pure $Si_3N_4$ layer must be formed, sputtering only of the Ar gas is carried out for a predetermined time after the formation of the second interference layer, thereby removing the oxides from the target surface.

In the case of using a nitrogen gas in forming the oxygen barrier layer, the target surface can be sometimes nitrided after the formation of the oxygen barrier layer. In that case, the second interference layer of nitrogen oxide is sometimes formed on the substrate on the successive carrier. When a pure $SiO_3$ layer must be formed, sputtering of only an Ar gas is carried out for a predetermined time after the formation of the oxygen barrier layer, thereby removing the nitrides from the target surface.

When only an Ar gas is introduced into chamber 9-7 in forming the oxygen barrier layer, a Si layer is formed on substrate 9-1. However, since oxides of Si are sometimes formed on the surface of Si target during the formation of the second interference layer, depending on sputtering power and sputtering gas flow rate, unsaturated oxides such as SiO, etc. are sometimes formed even in the case of using only the Ar gas.

After forming both the second interference layer and the oxygen barrier layer, using the common single target, electric current supply from power supply for sputtering 9-10 is discontinued. All the sputtering gas flow rates are made zero by closing individual mass flow controllers 9-6. Then, carrier 9-2 is made to leave chamber 9-7 and moved to the successive chamber. In FIG. 9, numeral 9-9 is a power transmittance for sputtering.

Method 1 for Manufacturing Information Recording Medium

On a polycarbonate substrate for land-groove recording, 0.6 mm thick, with a track pitch of 0.615 µm and a groove depth of 65 nm, and with address information for recording information on both lands and grooves being provided at individual sector head parts were formed thin films (first interference layer: $(ZnS)_{80}(SiO_2)_{20}$ (100 nm); second interference layer: $Al_2O_3$ (30 nm), first interface layer: $Cr_2O_3$ (1 nm), recording layer: $Ge_{28}Sb_{18}Te_{54}$ (7 nm), second interface layer: CrO (5 nm), third interference layer: $(ZnS)_{80}(SiO_2)_{20}$ (40 nm), thermal buffer layer: $Cr_{90}(Cr_2O_3)_{10}$ (30 nm), and heat diffusion layer: $Al_{99}Ti_1$ (50 nm)).

Sputtering conditions for forming the individual layers are shown in Table 1. In manufacturing the information recording medium in the aforementioned structure, the sputtering rate of the second interference layer ($Al_2O_3$) was low, e.g. 0.95 nm/s, so it took 31.6 seconds to form the second interference layer having a thickness of 30 nm. The sputtering rates of other layers were relatively high, so it took 6.5 seconds to form the first interference layer, whose sputtering time was the next longest to that of the second interference layer. Thus, the second interference layer was a bottleneck in shortening the manufacturing time. Thus, the second interface layer was formed in two chambers on trial. As a result, the sputtering time of the second interference layer became 15.8 seconds per chamber, and the manufacturing time of a second interference layer so called cycle time including the transfer time (2 seconds) became 17.8 seconds.

Refractive indice of the substrate and the individual layers are shown below:

Substrate: (1.58, 0.00)

First interference layer: (2.16, 0.00)

Second interference layer: (1.65, 0.00)

First interface layer: (2.6, −0.09)

Recording layer (crystalline): (4.57, −5.48)

Recording layer (amorphous): (4.51, −2.22)

Second interface layer: (2.6, −0.09)

Third interference layer: (2.16, 0.00)

Thermal buffer layer: (4.09, −2.83)

Heat diffusion layer: (1.84, −5.74)

Reflectance R of the optical disc, Read signal jitter after 10 runs of overwriting $J_{10}$, read signal jitter after 10,000 runs of overwriting $J_{10000}$, and read signal jitter $J_{90}$ obtained by conducting overwriting on the medium stored at 90° C. for 100 hours as an accelerated test are shown below:

R: 20.5%

$J_{10}$: 85

$J_{10000}$: 10%

$J_{90}$: 10%

As shown above, R and $J_{10}$ were satisfactory, but $J_{10000}$ and $J_{90}$ were slightly increased. This was due to diffusion of oxygen in the second interference layer into the recording layer by many runs of overwriting and accelerated test and the resulting lowering of the crystallization rate of the recording layer, as already mentioned before.

information on both lands and grooves being provided at individual sector head parts were formed thin films (first interference layer: $(ZnS)_{80}(SiO)_{20}$ (105 nm), second interference layer: $SiO_2$ (24 nm), first interface layer: $Cr_2O_3$ (1 μm), recording layer: $Ge_{28}Sb_{18}Te_{54}$ (7 nm), second interface layer: $Cr_2O_3$ (5 nm), third interference layer: $(ZnS)_{80}(SiO_2)_{20}$ (40 nm), thermal buffer layer: $Cr_{90}(Cr_2O_3)$ (30 nm), and heat diffusion layer: $Al_{99}Ti_1$ (50 nm).

Sputtering conditions used for forming the individual layers are shown in Table 2. In manufacturing the information recording medium in the aforementioned structure, the sputtering rate of the second interference layer ($SiO_2$) was low, e.g. 2.2 nm/s, so it took 11.0 seconds to form the second interference layer having a thickness of 24 nm. The sputtering rates of other layers were relatively high, so it took 6.8 seconds to form the first interference layer, whose sputtering time was the next longest to that of the second interference layer. Thus, the second interference layer was a bottleneck in shortening the manufacturing time. Thus, the second interference layer was formed in two chambers on trial. As a result, the sputtering time of the second interference layer became 5.5 seconds per chamber, and the sputtering time of the first interference layer become a bottleneck. The manufacturing time of one first interference layer (so called cycle time), i.e. total sputtering time of first interference layer including its transfer time (2 seconds), became 8.8 seconds.

Refractive indice of the substrate and the individual layers are shown below:

Substrate: (1.58, 0.00)

First interference layer: (2.16, 0.00)

Second interference layer: (1.46, 0.00)

First interface layer: (2.6, 0.00)

Recording layer (crystalline): (4.57, −5.46)

Recording layer (amorphous): (4.51, −2.22)

Second interface layer: (2.6, −0.09)

TABLE 1

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 100 | 6.5 |
| 2nd chamber | 2nd interference layer | $Al_2O_3$ | RF | 4.5 | Ar | 25 | 0.95 | 15 | 15.8 |
| 3rd chamber | 2nd interference layer | $Al_2O_3$ | RF | 4.5 | Ar | 25 | 0.95 | 15 | 15.8 |
| 4th chamber | 1st interface layer | $Cr_2O_3$ | RF | 4 | Ar | 5 | 1.3 | 1 | 0.8 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 30 | 2.6 |
| 9th chamber | Heat diffusion layer | $Al_{99}Ti_1$ | DC | 4.5 | Ar | 15 | 12.5 | 50 | 4.0 |

Note:
Target compositions all by atomic %

Method 2 for Manufacturing an Information Recording Medium

On a polycarbonate substrate for land-groove recording, 0.6 mm thick, with a track pitch of 0.615 μm and a groove depth of 65 μm and with address information for recording Third interference layer: (2.16, 0.00)

Thermal buffer layer: (4.09, −2.88)

Heat diffusion layer: (1.84, −5.74)

Reflectance R of the optical disc, read signal jitter $J_{10}$ after 10 runs of overwriting, read signal jitter $J_{10000}$ after 10,000 runs of overwriting and read signal jitter $J_{90}$ obtained by conducting overwriting on the medium stored at 90° C. for 100 hours as an accelerated test are shown below:

R: 20.1%

$J_{10}$: 7.7%

$J_{10000}$: 10.5%

$J_{90}$: 10.5%

As shown above, R and $J_{10}$ were satisfactory, but $J_{10000}$ and $J_{90}$ were increased, though slightly. This was due to diffusion of oxygen in the second interference layer into the recording layer by many runs of overwriting and the accelerated test, and the resulting lowering of the crystallization rate of the recording layer, as already mentioned before.

bottleneck. Manufacturing time of one second interference layer (so called cycle time), i.e. total time of the sputtering time of the second interference layer including its transfer time (2 seconds) became 6.5 seconds.

Refractive indice of the substrate and the individual layers are shown below:

Substrate: (1.58, 0.00)

First interference layer: (2.16, 0.00)

Second interference layer: (1.70 −0.01)

First interface layer: (2.6, −0.09)

TABLE 2

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 105 | 6.8 |
| 2nd chamber | 2nd interference layer | $Al_2O_3$ | RF | 4.5 | Ar | 25 | 2.2 | 11 | 5.0 |
| 3rd chamber | 2nd interference layer | $Al_2O_3$ | RF | 4.5 | Ar | 25 | 2.2 | 12 | 5.5 |
| 4th chamber | 1st interface layer | $Cr_2O_3$ | RF | 4 | Ar | 5 | 1.3 | 1 | 5.5 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 30 | 2.6 |
| 9th chamber | Heat diffusion layer | $Al_{99}Ti_1$ | DC | 4.5 | Ar | 15 | 12.5 | 50 | 4.0 |

Note:
Target compositions all by atomic %

Method 3 for Manufacturing Information Recording Medium

On a polycarbonate substrate for land-groove recording, 0.6 mm thick, with a track pitch of 0.615 μm and a groove depth of 65 nm, and with address information for recording information on both lands and grooves being provided on individual sector head parts were formed thin films (a first interference layer: $(ZnS)_{80}(SiO_2)_{20}$ (110 nm), a second interference layer: $Al_2O_3$ (30 nm), a first interface layer: $Cr_2O_3$ (1 μm), a recording layer: $Ge_{28}Sb_{18}Te_{54}$ (7 nm), a second interface layer: $Cr_2O_3$ (5 nm), a third interference layer: $(ZnS)_{80}(SiO_2)_{20}$ (40 nm), a thermal buffer layer: $Cr_{90}(Cr_2O_3)_{10}$ (30 nm), and a heat diffusion layer: $Al_{99}Ti_1$ (50 nm)).

Sputtering conditions for the individual layers are shown in Table 3. The difference in Method 1 was in the formation of the $Al_2O_3$ layer as the second interference layer by reactive sputtering of Al with Ar+$O_2$. As a result, DC power source could be used as a sputtering power source, resulting in a large increase in the sputtering rate. In that case, the sputtering time required for forming the second interference layer was 4.5 seconds. That is, the layer requiring the longest sputtering time was the first interference layer (7.0 seconds). Thus, the first interference layer was formed in two chambers on trial. As a result, the sputtering time of the first interference layer per chamber became 3.5 seconds, and the sputtering time of the second interference layer became a Recording layer (crystalline): (4.57, −5.48)

Recording layer (amorphous): (4.51, −2.22)

Second interface layer: (2.6, −0.09)

Third interference layer: (2.16, 0.00)

Thermal buffer layer: (4.09, −2.88)

Heat diffusion layer: (1.85, −5.74)

Reflectance R of the optical disc, read signal jitter $J_{10}$ after 10 runs of overwriting, read signal jitter $J_{10000}$ after 10,000 runs of overwriting and read signal jitter $J_{90}$ obtained by conducting overwriting on the medium stored at 90° for 100 hours as an accelerated test are shown below:

R: 18.1%

$J_{10}$: 8.7%

$J_{10000}$: 12.5%

$J_{90}$: 13.5%

As shown above, R was satisfactory, but $J_{10}$ was increased, though slightly. $J_{100000}$ and $J_{90}$ were considerably increased. In the case of forming the second interference layer by reactive sputtering, this was due to diffusion of oxygen in the second interference layer into the recording layer many runs of overwriting and the accelerated test, and the resulting lowering of the crystallization rate of the recording layer.

TABLE 3

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 55 | 3.5 |
| 2nd chamber | 2nd interference layer | $(ZnS)_{80}(SiO_2)_{20}$ | RF | 4.5 | Ar | 25 | 15.5 | 55 | 3.5 |
| 3rd chamber | 2nd interference layer | Al | DC | 4.5 | $Ar_{90}(O_2)_{10}$ | 25 | 6.6 | 30 | 4.5 |
| 4th chamber | 1st interface layer | $Cr_2O_3$ | RF | 4 | Ar | 5 | 1.3 | 1 | 0.8 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 30 | 2.6 |
| 9th chamber | Heat diffusion layer | $Al_{99}Ti_1$ | DC | 4.5 | Ar | 15 | 12.5 | 50 | 4.0 |

Note:
Target compositions all by atomic %

Method 4 for Manufacturing an Information Recording Medium

On a polycarbonate substrate for land-groove recording, 0.6 mm thick, with a track pitch of 0.615 μm and a groove depth of 65 nm, and with address information for recording information on both lands and grooves being provided on individual sector head parts were formed thin films (first interference layer: $(ZnS)_{80}(SiO_2)_{20}$ (110 nm), second interference layer: $SiO_2$ (24 nm), first interface layer: $Cr_2O_3$ (1 μm), recording layer: $Ge_{28}Sb_{18}Te_{54}$ (7 nm), second interface layer: $Cr_2O_3$ (5 nm), third interference layer: $(ZnS)_{80}(SiO_2)_{20}$ (40 nm), thermal buffer layer: $Cr_{90}(Cr_2O_3)10$ (30 nm) and heat diffusion layer: $Al_{99}Ti_1$ (50 nm)).

Sputtering conditions for the individual layers are shown in Table 4. Difference in Method 2 is in forming a $SiO_2$ layer as the second interference layer by reactive sputtering of Si and $Ar+O_2$. As a result, a DC power source could be used as the sputtering power source and thus the sputtering rate was largely increased. In that case, the sputtering time required for forming the second interference layer was 4.4 seconds, and the layer requiring the longest sputtering time was the first interference layer (7.0 seconds). Thus, the first interference layer was formed in two chambers on trial. As a result, the sputtering time of the first interference layer became 3.5 seconds perchamber, and the sputtering time of the second interference layer became a bottleneck. Manufacturing time of one second interference layer (so called cycle time), i.e. total sputtering time of the second interference layer including its transfer time (2 seconds) became 6.4 seconds.

Refractive indice of the substrate and the individual layers are as follows:

Substrate: (1.58, 0.00)
First interference layer: (2.16, 0.00)
Second interference layer: (1.71, −0.01)
First interface layer: (2.6, −0.09)
Recording layer (crystalline): (4.57, −5.46)
Recording layer (amorphous): (4.51, −2.22)
Second interface layer: (2.6, −0.09)
Third interference layer: (2.16, 0.00)
Thermal buffer layer: (4.09, −2.88)
Heat diffusion layer: (1.84, −5.74)

Reflectance R of the optical disc, read signal jitter $J_{10}$ after 10 runs of overwriting, read signal jitter $J_{10000}$ after 10,000 runs of overwriting and read signal jitter $J_{90}$ obtained by conducting overwriting on the medium stored at 90° for 100 hours as an accelerated test are shown below:

R: 18.4%
$J_{10}$: 8.5%
$J_{10000}$: 12.2%
$J_{90}$: 13.0%

As shown above, R was satisfactory, but $J_{10}$ was increased, though slightly. $J_{10000}$ and $J_{90}$ were considerably increased. In the case of forming the second interference layer by reactive sputtering, this was due to diffusion of oxygen in the second interference layer into the recording layer by many runs of overwriting and the accelerated test, and the resulting lowering of the crystallization rate of the recording layer.

TABLE 4

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 55 | 3.5 |
| 2nd | 2nd interference | $(ZnS)_{80}(SiO_2)_{20}$ | RF | 4.5 | Ar | 25 | 15.5 | 55 | 3.5 |

TABLE 4-continued

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 3rd chamber | 2nd interference layer | Si | DC | 4.5 | $Ar_{90}(O_2)_{10}$ | 25 | 5.5 | 24 | 4.4 |
| 4th chamber | 1st interface layer | $Cr_2O_3$ | RF | 4 | Ar | 5 | 1.3 | 1 | 0.8 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 30 | 2.6 |
| 9th chamber | Heat diffusion layer | $Al_{99}Ti_1$ | DC | 4.5 | Ar | 15 | 12.5 | 50 | 4.0 |

Note:
Target compositions all by atomic %

Method 5 for Manufacturing an Information Recording Medium

On a polycarbonate substrate for land-groove recording, 0.6 mm thick, with a track pitch of 0.615 μm and a groove depth of 65 nm, and with address information for recording information on both lands and grooves being provided on individual sector head parts are formed thin films (first interference layer: $(ZnS)_{86}(SiO_2)_{20}$ (110 nm), second interference layer: $SiO_2$ (22 nm), oxygen barrier layer: $Si_3N_4$ (5 nm), first interface layer: $Cr_2O_3$ (1 nm), recording layer: $Ge_{28}Sb_{18}Te_{54}$ (7 nm), second interface layer: $Cr_2O_3$ (5 nm), third interference: $(ZnS)_{80}(SiO_2)_{20}$ (40 nm), thermal buffer layer: $Cr_{90}(Cr_2O_3)_{10}$ (30 nm), and heat diffusion layer: $Al_{99}Ti_1$ (50 nm)).

Sputtering conditions for the individual layers are shown in Table 5. The difference in Method 4 is in the formation of a $SiO_2$ layer as the second interference layer y reactive sputtering of Si and $Ar+O_2$ and the formation of the oxygen barrier layer $Si_3N_4$ by changing the sputtering gas to $Ar+N_2$. As a result, the sputtering rate was largely increased. In that case, the sputtering time required for the second interference layer was 4.7 seconds, and the layer requiring the longest sputtering time was the first interference layer (7.0 seconds). Thus, the first interference layer was formed in two chambers on trial. As a result, the sputtering time of the first interference layer per chamber become 3.5 seconds, and the sputtering time of the second interference layer became a bottleneck. Manufacturing time of one second interference layer (so called cycle time), i.e. total sputtering of the second interference layer including its transfer time 82 seconds) became 6.7 seconds.

Refractive indice of the substrate and the individual layers are as follows:

Substrate: (1.58, 0.00)

First interference layer (2.16, 0.00)

Second interference layer (1.50, −0.01)

Oxygen barrier layer: (2.1, −0.02)

First interface layer: (0.6, −0.09)

Recording layer (crystalline): 4.57, −5.46)

Recording layer (amorphous): (4.51, −2.22)

Second interface layer: (2.6, −0.09)

Third interference layer: (2.16, 0.06)

Thermal buffer layer: (4.09, −2.88)

Heat diffusion layer: (1.84, −5.78)

Reflectance R of the optical disc, read signal jitter $J_{10}$ after 10 runs of overwriting, read signal jitter $J_{10000}$ after 10,000 runs of overwriting and read signal jitter $J_{90}$ obtained by conducting overwriting on the medium stored at 90° C. for 100 hours are shown below:

R: 18.1%

$J_{10}$: 7.7%

$J_{10000}$: 9.2%

$J_{90}$: 9.0%

As shown above, R was satisfactory, and $J_{10}$, $J_{10000}$ and $J_{90}$ jitters were all below 10%. This shown that in the case of forming the second interference layer by reactive sputtering, the oxygen in the second interference layer was diffused into the recording layer by many runs of overwriting and the accelerated test, resulting in the lowering of the crystallization rate of the recording layer, but diffusion of oxygen from the second interference layer could be controlled by providing an oxygen barrier layer between the second interference layer and the first interference layer, resulting in an increase in jitters after many runs of overwriting and the accelerated test, as already described before. Disco having the same structure as the aforementioned information recording medium except the groove depth of the substrate were manufactured on trial to determine occurrence of cross-erase phenomenon. The results are as follows:

| Groove depth (nm) | Occurrence of cross-erase phenomenon |
|---|---|
| 20 | yes |
| 25 | yes |
| 40 | none |
| 65 | none |
| 75 | none |

As is evident from the results, when the distance between the first interference layer and the recording layer (corresponding to sum total of thicknesses of the second interference layer, the oxygen barrier layer and the first interface layer: 28 nm) is smaller than the groove depth, the cross-erase phenomenon occurred, but when the distance between the first interference layer and the recording layer is larger than the groove depth, no cross-erase phenomenon occurred.

SnTeN in place of $Cr_2O_3$ as the first interface layer.

The refractive indice of the substrate and the individual layers are shown below:

Substrate: (1.58, 0.00)
First interference: layer (2.16, 0.00)
Second interference layer: (1.50, −0.01)
Oxygen barrier layer: (2.1, −0.02)
First interface layer: (4.4, −2.1)
Recording layer (crystalline): (4.57, −5.46)
Recording layer (amorphous): (4.51, −2.22)
Second interface layer: (2.6, −0.09)
Third interference layer: (2.16, 0.00)
Thermal buffer layer: (4.09, −2.88)
Heat diffusion layer: (1.84, −5.74)

Reflectance R of the optical disc, read signal jitter $J_{10}$ after 10 runs of overwriting, read signal jitter $J_{10000}$ after 10,000 runs of overwriting, and read signal jitter $J_{90}$ obtained by conducting overwriting on the medium stored at 90° C. for 100 hours are shown below:

TABLE 5

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 55 | 3.5 |
| 2nd chamber | 2nd interference layer | $(ZnS)_{80}(SiO_2)_{20}$ | RF | 4.5 | Ar | 25 | 15.5 | 55 | 3.5 |
| 3rd chamber | 2nd interference layer | Si | DC | 4.5 | $Ar_{90}(O_2)_{10}$ | 25 | 5.5 | 22 | 4.7 |
|  | Oxygen barrier layer |  |  | 4.5 | $Ar_{90}(N_2)_{10}$ | 5 | 7 | 5 |  |
| 4th chamber | 1st interface layer | $Cr_2O_3$ | RF | 4 | Ar | 5 | 1.3 | 1 | 0.8 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 30 | 2.6 |
| 9th chamber | Heat diffusion layer | $Al_{99}Ti_1$ | DC | 4.5 | Ar | 15 | 12.5 | 50 | 4.0 |

Note:
Target compositions all by atomic %

Method 6 for Manufacturing an Information Recording Medium

On a polycarbonate substrate for land-groove recording, 0.6 mm thick, with a track pitch of 0.1615 μm and a groove depth of 65 nm, and with address information for recording information on both lands and grooves being provided at individual sector head parts were formed thin films (a first interference layer: $(ZnS)_{80}(SiO_2)_{20}$ (110 nm), a second interference layer: $SiO_2$ (22 nm), an oxygen barrier layer: $Si_4N_4$ (5 nm), a first interface layer: SnTeN (2 nm), a recording layer: $Ge_{28}Sb_{18}Te_{54}$ (7 nm), a second interface layer: $Cr_2O_3$ (5 nm), a third interference layer: $(ZnS)_{80}(SiO_2)_{20}$ (40 nm), a thermal buffer layer: $Cr_{90}(Cr_2O_3)10$ (15 nm) and a heat diffusion layer: $Al_{99}Ti_1$ (50 nm).

Sputtering conditions for the individual layers are shown in Table 6. The difference in Method 5 was in the use of

R: 19.1%
$J_{10}$: 7.5%
$J_{10000}$: 8.2%
$J_{90}$: 8.0%

As shown above, R was satisfactory, and jitters $J_{10}$, $J_{10000}$ and $J_{90}$ were below 10%. This shows that in the case of forming the second interference layer by reactive sputtering, the oxygen in the second interference layer was diffused into the recording layer by many runs of overwriting and the accelerated test, resulting in lowering of the crystallization rate of the recording layer, but the diffusion of the oxygen from the second interface layer could be controlled by providing an oxygen barrier layer between the second interference layer and the first interface layer, resulting in an increase in the jitters after may runs of overwriting and the accelerated test, as already described before.

TABLE 6

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 55 | 3.5 |
| 2nd chamber | 2nd interference layer | $(ZnS)_{80}(SiO_2)_{20}$ | RF | 4.5 | Ar | 25 | 15.5 | 55 | 3.5 |
| 3rd chamber | 2nd interference layer | Si | DC | 4.5 | $Ar_{90}(O_2)_{10}$ | 25 | 5.5 | 22 | 4.7 |
|  | Oxygen barrier layer |  |  | 4.5 | $Ar_{99}(N_2)_1$ | 25 | 7 | 5 |  |
| 4th chamber | 1st interface layer | SnTe | DC | 0.2 | $Ar_{99}(N_2)_1$ | 5 | 2 | 2 | 1.0 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 15 | 1.3 |
| 9th chamber | Heat diffusion layer | $Al_{99}Ti_1$ | DC | 4.5 | Ar | 15 | 12.5 | 50 | 4.0 |

Note:
Target compositions all by atomic %

Method 7 for Manufacturing an Information Recording Medium

On a polycarbonate substrate for land-groove recording, 0.6 mm thick, with a track pitch of 0.615 μm and a groove depth of 65 nm, and with address information for recording information on both lands and grooves being provided on individual sector head parts were formed thin films (a first interference layer: $(ZnS)_{80}(SiO_2)_{20}$ (110 nm), a second interference layer: $Al_2O_3$ (25 nm), an oxygen barrier layer: AlN (5 nm), a first interface layer: SnTeN (2 nm), a recording layer: $Ge_{28}Sb_{18}Te_{54}$ (7 nm), a second interface layer: $Cr_2O_3$ (5 nm), a third interference layer: $(ZnS)_{80}(SiO_2)_{20}$ (40 nm), a thermal buffer layer: $Cr_{90}(Cr_2O_3)_{10}$ (15 nm), and a heat diffusion layer: $Al_{99}Ti_1$ (50 nm)).

Sputtering conditions for the individual layers are shown in Table 7. The difference in Method 6 was in forming an $Al_2O_3$ layer as the second interference layer by reactive sputtering of Al and $Ar+O_2$ and then forming an oxygen barrier layer AN by changing the sputtering gas to $Ar+N_2$.

The refractive indice of the substrate and the individual layers are as follows:

Substrate: (1.58, 0.00)

First interference layer: (2.16, 0.00)

Second interference layer: (1.70, −0.01)

Oxygen barrier layer: (2.0, −0.02) First interface layer: (4.4, −2.1)

Recording layer (crystalline): (4.57, −5.46)

Recording layer (amorphous): (4.51, −2.22)

Second interface layer: (2.6, −0.09)

Third interference layer: (2.16, 0.00)

Thermal buffer layer: (4.09, −2.88)

Head diffusion layer: (1.84, −5.74)

Reflectance R of the optical disc, read signal jitter $J_{10}$ after 10 runs of overwriting, read signal jitter $J_{10000}$ after 10,000 runs of overwriting, and read signal jitter $J_{90}$ obtained by conducting overwriting on the medium stored at 90° C. for 100 hours as an accelerated test are shown below:

R: 17.1%

$J_{10}$: 7.95

$J_{10000}$: 8.9%

$J_{90}$: 8.9%

As shown above, R was satisfactory and $J_{10}$, $J_{10000}$ and $J_{90}$ jitters were all below 10%. This shows that in the case of forming the second interference layer by reactive sputtering, the oxygen in the second interference layer was diffused into the recording layer by many runs of overwriting and the accelerated test, resulting in lowering of the crystallization rate of the recording layer, but the diffusion of oxygen from the second interference layer could be controlled by providing an oxygen barrier layer between the second interference layer and the first interface layer, resulting in an increase in jitters after many runs of overwriting and the accelerated test, as at ready described before.

TABLE 7

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 55 | 3.5 |
| 2nd chamber | 2nd interference layer | $(ZnS)_{80}(SiO_2)_{20}$ | RF | 4.5 | Ar | 25 | 15.5 | 55 | 3.5 |
| 3rd | 2nd interference | Al | DC | 4.5 | $Ar_{90}(O_2)_{10}$ | 25 | 6.6 | 25 | 4.4 |

TABLE 7-continued

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---------|-------|---------------------------|--------------|----------------------|----------------|--------------------------------|----------------------|----------------|--------------------------|
| chamber | layer | | | | | | | | |
| | Oxygen barrier layer | | | 4.5 | $Ar_{99}(N_2)_1$ | 25 | 8 | 5 | |
| 4th chamber | 1st interface layer | SnTe | DC | 0.2 | $Ar_{99}(N_2)_1$ | 5 | 2 | 2 | 1.0 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 15 | 1.3 |
| 9th chamber | Heat diffusion layer | $Al_{99}Ti_1$ | DC | 4.5 | Ar | 15 | 12.5 | 50 | 4.0 |

Note:
Target compositions all by atomic %

Method 8 for Manufacturing an Information Recording Medium

On a polycarbonate substrate for land-groove recording, 0.6 mm thick, with a track pitch of 0.615 μm and a groove depth of 65 nm, and with address information for recording on both lands and grooves being provided at individual sector head parts were formed thin films (a first interference layer: $(ZnS)_{80}(SiO_2)_{20}$ (110 nm), a second interference layer: $Al_2SiO_5$ (25 nm), an oxygen barrier layer: $AlSi_3N_5$ (5 nm), a first interface layer: SnTeN (2 nm), a recording layer: $Ge_{28}Sb_{18}Te_{54}$ (7 nm), a second interface layer: $Cr_2O_3$ (5 nm), a third interference layer: $(ZnS)_{80}(SiO_2)_{20}$ (40 nm), a thermal buffer layer: $Cr_{90}(Cr_2O_3)_{10}$ (15 nm), and a heat diffusion layer: $Al_{99}Ti_1$ (50 nm)).

Sputtering conditions for the individual layers are shown in Table 8. The difference in Method 7 was in forming an $Al_2SiO_5$ layer as the second interference layer by reactive sputtering of $Al_{50}Si_{50}$ and $Ar+O_2$ and then forming the oxygen barrier layer $AlSi_3N_5$ by changing the sputtering gas to $Ar+N_2$.

The refractive indice of the substrate and the individual layers are given below:

Substrate: (1.58, 0.00)

First interference layer: (2.16, 0.00)

Second interference layer: (1.65, −0.01)

Oxygen barrier layer: (0.2, −0.02)

First interface layer: (4.4, −2.1)

Recording layer (crystalline): (4.57, −5.46)

Recording layer (amorphous): (4.51, −2.22)

Second interface layer: (2.6, −0.09)

Third interference layer: (2.16, 0.00)

Thermal buffer layer: (4.09, −2.88)

Heat diffusion layer: (1.84, −5.74)

Reflectance R of the optical disc, read signal jitter $J_{10}$ after 10 runs of overwriting, read signal jitter $J_{10000}$ after 10,000 runs of overwriting and read signal $J_{90}$ obtained by conducting overwriting on the medium stored at 90° C. for 100 hours as an accelerated test are given below:

R: 18.1%

$J_{10}$: 8.0%

$J_{10000}$: 8.2%

$J_{90}$: 8.2%

As shown above, R was satisfactory and $J_{10}$, $J_{10000}$ and $J_{90}$ were all below 10%. This shows that in the case of forming the second interference layer by reactive sputtering, the oxygen in the second interference layer was diffused into the recording layer by many runs of overwriting and the accelerated test, resulting in lowering of the crystallization rate of the recording layer, but the diffusion of the oxygen from the second interference layer could be controlled by providing an oxygen barrier between the second interference layer and the fit interface layer, resulting in an increase in the jitters after many runs of over-writing and the accelerated test, as already described before.

TABLE 8

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---------|-------|---------------------------|--------------|----------------------|----------------|--------------------------------|----------------------|----------------|--------------------------|
| 1st chamber | 1st interference layer | $(ZnS)_{80}(SiO_2)_{20}$ | RF | 4.5 | Ar | 25 | 15.5 | 55 | 3.5 |
| 2nd chamber | 2nd interference layer | $(ZnS)_{80}(SiO_2)_{20}$ | RF | 4.5 | Ar | 25 | 15.5 | 55 | 3.5 |
| 3rd chamber | 2nd interference layer | $Al_{50}Si_{50}$ | DC | 4.5 | $Ar_{90}(O_2)_{10}$ | 25 | 6 | 24 | 4.7 |
| | Oxygen barrier layer | | | 4.5 | $Ar_{99}(N_2)_1$ | 25 | 7.5 | 5 | |
| 4th chamber | 1st interface layer | SnTe | DC | 0.2 | $Ar_{99}(N_2)_1$ | 5 | 2 | 2 | 1.0 |
| 5th chamber | Recording layer | $Ge_{28}Sb_{18}Te_{54}$ | RF | 0.6 | Ar | 5 | 5 | 7 | 1.4 |

TABLE 8-continued

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 15 | 1.3 |
| 9th chamber | Heat diffusion layer | $Al_{99}Ti_1$ | DC | 4.5 | Ar | 15 | 12.5 | 50 | 4.0 |

Note:
Target compositions all by atomic %

Method 9 for Manufacturing an Information Recording Medium

On a polycarbonate substrate for land-groove recording, 0.6 mm thick, with a track pitch of 0.615 μm and a groove depth of 65 nm, and with address information for recording information on both lands and grooves being provided at individual sector head parts, were formed thin films (a first interference layer: $(ZnS)_{80}(SiO_2)_{20}$ (110 nm), a second interference layer: $MgSiO_3$ (25 nm), an oxygen barrier layer: $MgSiO_2$ (5 nm), a first interface layer: SnTeN (2 nm), a recording layer: $Ge_{28}Sb_{18}Te_{54}$ (7 nm), a second interface layer: $Cr_2O$ (5 nm), a third interface layer: $(ZnS)_{80}(SiO_2)_{20}$ (40 nm), a thermal buffer layer: $Cr_{90}(Cr_2O_3)_{10}$ (15 nm), and a heat diffusion layer: $Al_{99}Ti_1$ (50 nm)).

Sputtering conditions for the individual layers are shown in Table 9. The difference in Method 8 is in forming an $MgSiO_3$ layer as the second interference layer by reactive sputtering of $Mg_2Si$ and $Ar+O_2$, and then an oxygen barrier layer $MgSiO_2$ (unsaturated oxide) by changing the sputtering gas to $Ar+O_2$ having low oxygen content.

Refractive indice of the substrate and the individual layers are given below:

Substrate: (1.58, 0.00)
First interference layer: (2.16, 0.00)
Second interference layer: (1.72, −0.01)
Oxygen barrier layer: (2.3, −0.08)
First interface layer: (4.4, −2.1)
Recording layer (crystalline): (4.57, −5.46)
Recording layer (amorphous): (4.51, −2.22)
Second interface layer: (2.6, −0.09)
Third interface layer: (2.16, 0.00)
Thermal buffer layer: (4.09, −2.88)
Heat diffusion layer: (1.84, −5.74)

Reflectance R of the optical disc, read signal jitter $J_{10}$ after 10 runs of overwriting, read signal jitter $J_{10000}$ after 10,000 runs of overwriting, and read signal jitter $J_{90}$ obtained by conducting overwriting on the medium stored at 90° C. for 100 hours as an accelerated test are given below:

R: 16.1%
$J_{10}$: 7.5%
$J_{10000}$: 9.2%
$J_{90}$: 8.8%

As shown above, R was slightly low, but $J_{10}$, $J_{10000}$ and $J_{90}$ jitters were all below 10%. This shows that in the case of forming the second interference layer by reactive sputtering, the oxygen in the second interference layer was diffused into the recording layer by many runs of overwriting and the accelerated test, resulting in lowering of the crystallization rate of the recording layer, but the diffusion of the oxygen from the second interference layer could be controlled by providing an oxygen barrier layer between the second interference layer and the first interface layer, resulting in an increase in the jitters after many runs of overwriting and the accelerated test.

TABLE 9

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 55 | 3.5 |
| 2nd chamber | 2nd interference layer | $(ZnS)_{80}(SiO_2)_{20}$ | RF | 4.5 | Ar | 25 | 15.5 | 55 | 3.5 |
| 3rd chamber | 2nd interference layer | $Mg_2Si$ | DC | 4.5 | $Ar_{90}(O_2)_{10}$ | 25 | 5.2 | 24 | 5.4 |
|  | Oxygen barrier layer |  |  | 4.5 | Ar | 25 | 6 | 5 |  |
| 4th chamber | 1st interface layer | SnTe | DC | 0.2 | $Ar_{99}(N_2)_1$ | 5 | 2 | 1.5 | 0.8 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |

TABLE 9-continued

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 8th chamber | Thermal buffer layer | $Cr_{90}(Cr_2O_3)_{10}$ | DC | 4.5 | Ar | 15 | 11.5 | 15 | 1.3 |
| 9th chamber | Heat diffusion layer | $Al_{99}Ti_1$ | DC | 4.5 | Ar | 15 | 12.5 | 50 | 4.0 |

Note:
Target compositions all by atomic %

Method 10 for Manufacturing an Information Recording Medium

On a polycarbonate substrate of land-groove recording, 0.6 mm thick, with a track pitch of 0.615 μm and a groove depth of 65 nm, and with address information for recording information on both lands and grooves being provided on individual sector head parts were formed thin films (a first interference layer: $(ZnS)_{80}(SiO_2)_{20}$ (119 nm), a second interference layer: $SiO_2$ (22 nm), an oxygen barrier layer: SiON (2 nm), a first interface layer: $Cr_2O_3$ (15 nm), a recording layer: $Ge_{28}Sb_{18}Te_{54}$ (7 nm), a second interface layer: $Cr_2O_3$ (5 nm), a third interference layer: $(ZnS)_{80}(SiO_2)_{20}$ (40 nm), a thermal buffer layer: $Cr_{90}(Cr_2O_3)_{10}$ (30 nm), and a heat diffusion layer: $Al_{99}Ti_1$ (50 nm)).

Sputtering conditions for the individual layers are shown in Table 10. The difference in Method 9 is in forming an $SiO_2$ layer as the second information layer by reactive sputtering of SiO and Ar+$O_2$ and then forming an oxygen barrier layer SiO (unsaturated oxide) by changing the sputtering gas to Ar.

Refractive indice of the substrate and the individual layers are as follows:

Substrate: (1.58, 0.00)
First interference layer: (2.16, 0.00)
Second interference layer: (1.48, −0.00)
Oxygen barrier layer: (2.1, −0.03)
First interface layer: (2.6, −0.09)
Recording layer (crystalline): (4.57, −5.46)
Recording layer (amorphous): (4.51, −2.22)
Second interface layer: (2.6, −0.09)
Third interference layer: (2.16, 0.00)
Thermal buffer layer: (4.09, −2.88)
Heat diffusion layer: (1.84, −−5.74)

Reflectance R of the optical disc, read signal jitter $J_{10}$ after 10 runs of overwriting, read signal jitter $J_{10000}$ after 10,000 runs of overwriting and read signal jitter $J_{90}$ obtained by conducting overwriting on the medium stored at 90° C. for 100 hours as an accelerated test are given below:

R: 19.1%
$J_{10}$: 7.9%
$J_{10000}$: 9.7%
$J_{90}$: 8.5%

As shown above, R was satisfactory, and $J_{10}$, $J_{10000}$ and $J_{90}$ jitters were all below 10%. This shows that in the case of forming the second interference layer by reactive sputtering, the oxygen in the second interference layer were diffused into the recording layer by many runs of overwriting and the accelerated test, resulting in lowering of the crystallization rate of the recording layer, but the diffusion of the oxygen from the second interference layer could be controlled by providing an oxygen barrier layer between the second interference layer and the first interface layer, resulting in an increase in jitters after many runs of overwriting and the accelerated test, as already described before.

TABLE 10

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 55 | 3.5 |
| 2nd chamber | 2nd interference layer | $(ZnS)_{80}(SiO_2)_{20}$ | RF | 4.5 | Ar | 25 | 15.5 | 55 | 3.5 |
| 3rd chamber | 2nd interference layer | SiO | RF | 4.5 | $Ar_{90}(O_2)_{10}$ | 25 | 3 | 22 | 7.8 |
|  | Oxygen barrier layer |  |  | 4.5 | Ar | 25 | 4 | 2 |  |
| 4th chamber | 1st interface layer | $Cr_2O_3$ | RF | 0.2 | $Ar_{99}(N_2)_1$ | 5 | 2 | 1.5 | 0.8 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 15 | 1.3 |
| 9th chamber | Heat diffusion layer | $Al_{99}Ti_1$ | DC | 4.5 | Ar | 15 | 12.5 | 50 | 4.0 |

TABLE 10-continued

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|

Note:
Target compositions all by atomic %

Method 11 for Manufacturing an Information Recording Medium

On a polycarbonate substrate for land-groove recording, 0.6 mm, thick, with a track pitch of 0.615 μm and a groove depth of 65 nm, and with address information for recording information on both lands and grooves being provided at individual sector head parts were formed thin films (a first interference layer: $(ZnS)_{80}(SiO)_{20}$ (110 nm), a second interference layer: $SiO_2$ (22 nm), an oxygen barrier layer: $Si_2O_2N$ (5 nm), a first interface layer: $Cr_2O_3$ (1.5 nm), a recording layer: $Ge_{28}Sb_{18}Te_{54}$ (7 nm), a second interface layer: $Cr_2O_3$ (5 nm), a third interference layer: $(ZnS)_{80}(SiO_2)_{20}$ (40 nm), a thermal buffer layer: $Gr_{90}(Cr_2O_3)_{10}$ (30 nm) and a heat diffusion layer: $Al_{99}Ti_1$ (50 nm)).

Sputtering conditions for the individual layers are shown in Table 11. The difference in Method 10 was in forming a $SiO_2$ layer as the second interference layer by reactive sputtering of SiO and $Ar+O_2$, and then forming an oxygen barrier layer $Si_2O_2$ N (unsaturated oxide) by changing the sputtering gas to $Ar+N_2$.

Refractive indice of the substrate and the individual layers are as follows:

Substrate: (1.58, 0.00)

Fits interference layer: (2.16, 0.00)

Second interference layer: (1.48, −0.00)

Oxygen barrier layer: (2.3, −0.02)

First interface layer: (2.6, −0.09)

Second interface layer: (2.6, −0.09)

Third interference layer: (2.16, 0.00)

Thermal buffer layer: (4.09, −2.88)

Heat diffusion layer: (1.84, −5.74)

Reflectance r of the optical disc, read signal jitter $J_{10}$ after 10 runs of overwriting, read signal jitter $J_{10000}$ after 10,000 runs of overwriting and read signal jitter $J_{90}$ obtained by overwriting on the medium stored at 90° C. for 100 hours as an accelerated test are given below:

R: 19.5%

$J_{10}$: 7.7%

$J_{10000}$: 9.55

$J_{90}$: 8.3%

As shown above, R was satisfactory, and $J_{10}$, $J_{10000}$ and $J_{90}$ jitters were all below 105. This shows that in the case of forming the second interference layer by reactive sputtering, the oxygen in the second interference layer was diffused into the recording layer by many runs of overwriting and the accelerated test, resulting in lowering of the crystallization rate of the recording layer, but the diffusion of the oxygen from the second interference layer could be controlled by providing an oxygen barrier layer between the second interference layer and the first interface layer, resulting in an increase in the jitters after many runs of overwriting and the accelerated test, as already, described above.

TABLE 11

| Chamber | Layer | Sputter target composition | Power source | Sputtering power (kW) | Sputtering gas | Sputtering gas flow rate (sccm) | Sputtering rate (nm/s) | Thickness (nm) | Sputtering time (seconds) |
|---|---|---|---|---|---|---|---|---|---|
| 1st chamber | 1st interference layer | $(ZnS)_{80}(SiO_2)_{20}$ | RF | 4.5 | Ar | 25 | 15.5 | 55 | 3.5 |
| 2nd chamber | 2nd interference layer | $(ZnS)_{80}(SiO_2)_{20}$ | RF | 4.5 | Ar | 25 | 15.5 | 55 | 3.5 |
| 3rd chamber | 2nd interference layer | SiO | RF | 4.5 | $Ar_{90}(O_2)_{10}$ | 25 | 3 | 22 | 8.9 |
|  | Oxygen barrier layer |  |  | 4.5 | $Ar_{90}(N_2)_{10}$ | 25 | 3.2 | 5 |  |
| 4th chamber | 1st interface layer | $Cr_2O_3$ | RF | 0.2 | $Ar_{99}(N_2)_1$ | 5 | 2 | 1.5 | 0.8 |
| 5th chamber | Recording layer | $Ge_{28}Sb_{18}Te_{54}$ | RF | 0.6 | Ar | 5 | 5 | 7 | 1.4 |
| 6th chamber | 2nd interface layer | $Cr_2O_3$ | RF | 4 | Ar | 5 | 1.3 | 5 | 3.8 |
| 7th chamber | 3rd interference layer | $(ZnS)_{80}(SiO_2)_{20}$ | RF | 4.5 | Ar | 25 | 15.5 | 40 | 2.6 |
| 8th chamber | Thermal buffer layer | $Cr_{90}(Cr_2O_3)_{10}$ | DC | 4.5 | Ar | 15 | 11.5 | 15 | 1.3 |
| 9th chamber | Heat diffusion layer | $Al_{99}Ti_1$ | DC | 4.5 | Ar | 15 | 12.5 | 50 | 4.0 |

Note:
Target compositions all by atomic %

Recording layer (crystalline): (4.57, −5.46)

Recording layer (amorphous): (4.51, −2.22)

In the foregoing embodiments, in forming the second interference layer, oxides of low refractive index were obtained with an $Ar+O_2$ gas, whereas in forming the oxygen barrier layer, nitrides having a lower oxygen content than that of the second interference layer were obtained by changing the sputtering gas species to Ar+$N_2$. However, nitrogen is sometimes unintentionally mixed into the second interference layer and oxygen is sometimes unintentionally mixed into the oxygen barrier layer by repeating the aforementioned process. That is, for example, in the case of sputtering a Si target with an Ar+$O_2$ gas to form the second interference layer, a $SiO_2$ layer is formed. Even by changing the sputtering gas species to Ar+$N_2$, nitrogen oxides of Si—O—N series are formed without rapid formation of a $Si_3N_4$ layer. This is due to formation of $SiO_2$ on the Si target surface at the time of forming the $SiO_2$ film, and the resulting $SiO_3$ on the Si target surface being sputtered even by changing the sputtering gas species to Ar+$N_2$. As a result, oxygen is liable to diffuse into the recording layer, as compared with pure nitrides, but when the thickness of the oxygen barrier layer is about 5 nm, the oxygen content is much lowered nearly at the interface between the first interface layer and the oxygen barrier layer, resulting in no particularly series problem.

In the case of forming the oxygen barrier layer by an Ar—$N_2$ sputtering gas, $Si_3N_4$ is formed on the Si target surface in the same manner as in the case of the second interference layer. Thus, when the second interference layer is formed on the successive substrate, nitrogen oxides of Si—O—N series is formed without forming $SiO_2$. As a result, such a problem that the refractive index of the second interference layer becomes higher than that of SiO is encountered, but so long as materials easy to form oxides of low refractive index, such as Si, Al, Mg, etc. is used, such a problem is not particularly encountered.

Optimum Composition and Optimum Thickness of the Individual Layers

First Interference Layer

Materials present on the light incident side of the first interference layer is usually a plastic substrate of polycarbonate, etc., or organic materials such as ultraviolet-curing resin, etc. Refractive indice of these materials are about 1.4–1.6. To effectively attain reflection between the organic materials and the first interference layer, the refractive index of the first interference layer is desirably 2.0 or more.

Optically, the first interference layer must have a higher refractive index than that of materials present on the light incident side to the first interference layer (the materials corresponds to a substrate in the present embodiments), and it is preferable that the higher refractive index is better within such a range that no light absorption takes place. Specifically, the material for the first interference layer must have a refractive index of 2.0–3.0 and will not absorb light. It is particularly desirable that the first interference layer contains oxides, carbides, nitrides, sulfides, and selenides of metals. It is further desirable that at least the thermal conductivity is 2 w/mk or less. Particularly, compounds of ZnS—$SiO_2$ series have low thermal conductivity and is most suitable for the first interference layer.

Second Interference Layer

At least the refractive index of the second interference layer must be lower than that of the first interference layer and is desirable not more than 1.8. Particularly, materials of low refractive index such as $Al_2O_3$, $SiO_2$, MgO, etc. are suitable for the second interference layer. A mixture of these materials can be also used. The refractive indice of $Al_2O_3$, $SiO_2$ and MgO measured by the present inventors are 1.64, 1.46 and 1.73, respectively. Refractive index of a mixture changes in proportion to a mixing ratio. Refractive indice of the mixtures have been found all to be not more than 1.8. Usually in the case that the second interference layer contains an oxide of any element selected from Al, Si and Mg, the refractive index is lowered in proportion to the content of these oxides. Thus, the sum total of contents of oxides of Al, Si and Mg contained in the second interference layer must be larger than the sum total of contents of the oxides contained in the first interference layer.

Properties required for the second interference layer are that the refractive index is lower than that of the first interference layer, and the second interference layer is thermally and chemically stable. Such materials contain an oxide of any one of Al, Si and Mg, and if the sum total of composition ratios of O, N, C and S in the second interference layer is let to be Z, it is important that the composition ratio of O is 50% or more of Z and the sum total of composition ratios of Al, Si and Mg is 70% or more of 1-Z. When the composition ratio of O is less than 505, or the sum total of composition ratios Al, Si and Mg is less than 70% of 1-Z, the refractive index tends to increase, because the effect of the present invention becomes hard to attain.

Oxygen Barrier Layer

Figure 10:
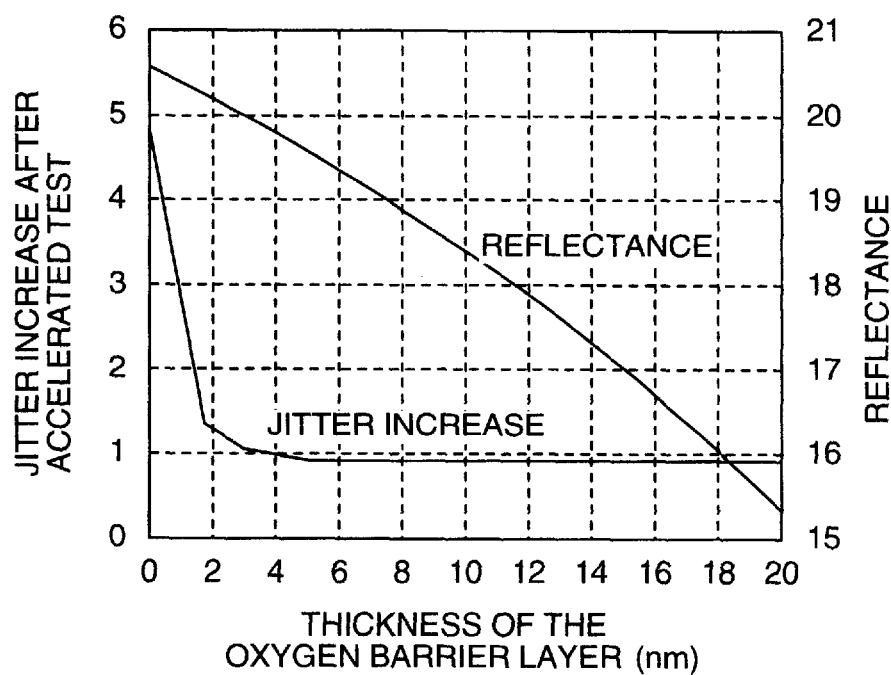
FIG. 10 is a diagram showing one embodiment of the present invention in relation to the thickness of oxygen barrier layer.

The oxygen barrier layer plays a role of controlling diffusion of oxygen from the second interference layer, as already mentioned before, and the dielectrics of a high melting point having a lower oxygen content than that of the second interference layer and a higher melting point than that of at least the recording layer are suitable for the oxygen barrier layer. For example, $Si_3N_4$, AlN and $Mg_3N_2$ or mixtures of these compounds, such as Al—Si—N, Mg—Si—N, Mg—Al—N, etc. can be used. Furthermore, the dielectrics, even if they contain oxygen, can attain the oxygen barrier effect, so long as the oxygen content is low. For example, unsaturated oxides of Si—O, Al—O and Mg—O series, which have a lower oxygen content than those of $SiO_2$, $Al_2O_3$ and MgO, can be also used. Furthermore, nitrogen oxides of Si—O—N, Al—O—N and Mg—O—N series, which have a lower oxygen content than those of $SiO_2$, $Al_2O$ and MgO can be used. Relations between the thickness of the oxygen barrier layer, reflectance and jitter increase (%) by the accelerated test (a difference between read signal jitter after 10 runs of overwriting and read signal jitter obtained by conducting overwriting on the medium stored at 90° C. for 100 hours), when $Si_3N_4$ is used for the oxygen barrier layer are shown in FIG. 10. When the thickness of the oxygen barrier layer is smaller than 2 nm, the jitter increase by the accelerated test becomes abruptly high, whereas at 2 nm or more the jitter increase is less than 1.5% and thus satisfactory. When the thickness of the oxygen barrier layer is more than 15 nm, the reflectance becomes less than the desired 175, whereas when the thickness of the oxygen barrier layer is 15 nm or less, the reflectance is more than the desired 17%. Optimum thickness of the oxygen barrier layer is 2–15 nm.

First Interface Layer

Usually, hard-to-absorb, simple compounds of stoichiometrical composition or their mixtures are suitable for the second interference layer, but when such compounds or mixtures are stacked in contact with the recording layer, defects due to film peeling is liable to take place between the recording layer and the second interference layer. In that case, to improve the adhesiveness between the second interference layer and the recording layer, the first interface layer must be provided therebetween.

Usually, peeling is liable to take place between the recording layer and the second interference layer according to the content of oxides of Al, Si and Mg. Thus, it is required that the sum total of contents of oxides of Al, Si and Mg contained in the first interface layer is smaller than that of contents of oxides of Al, Si and Mg contained in the second interference layer. Oxides and nitrides of transition metal element capable of forming nonstoichiometric compounds or mixtures of these oxides and nitrides are particularly suitable for the first interface layer. Furthermore, oxides and nitrides of semiconductors such as Si, Ge etc. can form nonstoichiometric compounds and thus are also suitable.

Specifically, oxides and nitrides of Ti, V, Cr, Mn, Fe, Co, Ni, C, Y, Zn, Nb, Mo, Tc, Hf, Ta, W, La, Ce, etc. or their mixtures are suitable. Particularly, oxides such as Cr—O series materials and Co—O series materials such as $Co_2O_3$, CoO, etc., nitrides such as Ta—N series materials, Al—N series materials, Si—N series materials, Si—N series materials, Al—Si—N series materials (e.g. $AlSiN_2$), Ge—N series materials, etc., carbides such as sic, CoC, etc., or their mixtures can be used. Metal tellurides, semiconductor tellurides or nitrides of these tellurides can be also used. In that case, since the nucleation rate of the recording layer is increased, such effects as an increase in the storage life, erase characteristic at the time of overwriting, etc. can be obtained.

The above-mentioned materials usually absorb light and thus no optically good effects can be obtained. However, it is practically preferable to provide the first interface layer because of its distinguished effects on the control of film peeling, the increase in storage life, and the control of deterioration due to many runs of overwriting. Thus the lower the thickness of the first interface layer within such a range that the aforementioned effects are not lost, the better. According to the studies made by the present inventors, thickness of the first interface layer of 0.5 nm or more is satisfactory. Above 5 nm such troubles as lowering of reflectance, lowering of signal amplitude, etc. are liable to appear, whereas above 20 nm lowering of reflectance and lowering of signal amplitude become considerable and reads an impractical level. Thus, the thickness of the first interface layer is 0.5–20 nm, desirably 0.5–5 nm.

Recording Layer

Phase-change recording materials are particularly suitable for the recording material for use in the present invention. As substitute recording materials for $Ge_{28}Sb_{18}Te_{54}$ used in the foregoing embodiments, compositions comprising 23–33 atom % of Ge, 10–25 atom % of Sb and 5–60 atom % of Te are distinguished particularly in making lowering of number of overwriting runs, addition of 1–7% of $AgSbTe_2$ thereto has an effect on control of recording layer flow, which takes places at the time of many runs of overwriting.

Other material other than the above-mentioned material include $Ge_2Sb_2Te_5$, $GeSb_2Te_4$, $GeSb_4Te_7$, $In_3SbTe_2$, $In_{35}Sb_{32}Te_{33}$, $In_{31}Sb_{26}Te_{43}$, Gete, Ag—In—Sb—Te, Co—Ge—Sb—Te, V—Ge—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te, Bi—Ge—Sb—Te, W—Ge—Sb—Te.

In the case of the recording layers of the above-mentioned recording layer compositions containing not more than 5 atom % of nitrogen, the read signal output is reduced, but the recording layer flow can be controlled at the time of many runs of overwriting as an advantage.

When the thickness of the recording layer is less than at least the step difference (groove depth) between the lands and the grooves, the effect of reducing the occurrence of cross-erase phenomenon is large. In the case of the thickness of the recording layer of 4–20 nm, the degree of modulation is high and the recording layer flow takes place less. The thickness of the recording layer of 4–10 nm is better. When the thickness of the recording layer is less than 4 nm, the reflectance, signal amplitude, etc. are considerably lowered, but the effect on control of overwrite jitters, and the effect on the recording layer flow at the time of many runs of overwriting are remarkable. When the thickness of the recording layer is more than 10 nm, the reflectance, signal amplitude, etc. are satisfactory, whereas troubles such as the overwrite jitter increase, recording layer flow at the time of overwriting, etc. are pronounced.

In the embodiments, recording is carried out on the phase change recording layer comprising Ge, Sb, Te, In, Ag, Sn, etc. in the optical disc, but the essential of the present invention is to prevent oxidation of the recording layer in the optical disc, where heat is generated by a laser beam and recording of record marks is conducted by the heat, and thus the present invention is not limited to the phase change optical disc, but the effect of the present invention can be attained in recording on a photomagnetic recording layer comprising Tb, Fe, Co, Dy, Gd, etc. as the main components.

Second Interference Layer

Oxides and nitrides of transition metal elements capable of forming nonstoichiometric compounds or the mixtures as in the first interface layer are suitable for the second interface layer. Oxides and nitrides of semiconductors such as Si, Ge, etc. can easily form nonstoichiometric compounds and thus are suitable.

Specifically, oxides and nitrides of Ti, v, Cr, Mn, Fe, Co, Ni, Cu, Y, Zr, N, Mo, Tc, Hf, Ta, W, La, Ce, etc. or their mixtures are suitable. Oxides such as Cr—O series materials, Co—O series materials e.g. $Co_2O_3$, CoO, etc., nitrides such as TaN, AlN, Si—N series materials, e.g. $Si_3N_4$, etc., Al—Si—N series materials, e.g. $AlSiN_2$, Ge—N series materials, etc., carbides such as SiC, GeC, etc., or their mixtures are particularly suitable. Metal tellurides, semiconductor tellurides, or nitrides of these tellurides are also suitable. In that case, such effects as an increase in storage life, and improvement of erasing characteristics at the time of overwriting can be obtained because of an increase in the nucleation rate of the recording layer.

The above-mentioned materials usually absorb light, and no optically good effect can be obtained. However, effects on control of film peeling, an increase in the storage life, and control of deterioration by many runs of overwriting are remarkable. The difference between the first interface layer and the second interface layer is a difference in the material present on the opposite side to the adjacent side with the recording layer. In the case of the first interface layer, the second interference layer is present on the opposite side to the adjacent side with the recording layer, whereas in the case of the second interface layer, the third interference layer is present on the opposite side to the adjacent side with the recording layer. The second interference layer comprises oxides of Al, Si, Mg, etc. as the main components, as mentioned before, and thus is thermally and chemically stable. On the other hand, the third interference layer comprises sulfides such as ZnS, etc. as the main components, as mentioned above, and thus is thermally and chemically unstable. In that case, if the thickness of the second interface layer is too small, S atoms in the third interference layer diffuse into the recording layer at the tie of many runs of overwriting, resulting in deterioration such as lowering of reflectance, lowering of crystallization rate, etc. Thus, the thinner the thickness of the second interface layer within such a range that the aforementioned effects are not lost, the better. According to the studies made by the present inventors, the thickness of the second interface layer of 5 nm or more is satisfactory. Above 10 nm, troubles such as lowering of reflectance, lowering of signal amplitude, etc. are liable to appear. Above 20 nm, the lowering of reflectance and the lowering of signal amplitude become considerable and are on an impractical level. Thus, the thickness of the second interface layer is 5–20 nm, desirably 5–10 nm.

Third Interference Layer

Optically light-unabsorbable materials, thermally materials having as low a thermal conductivity as possible are suitable for the interference layer. Specifically, light-unabsorbable materials having a refractive index n of 1.5–3.0, which particularly comprise oxides, carbides, nitrides, sulfides, and selenides of metals, are desirable.

Particularly $(ZnS)_{80}(SiO_2)_{20}$ (molar ratio) or in changed mixing ratio of ZnS to $SiO_2$ (50–95 mole % of ZnS) has a considerably low thermal conductivity and thus is most suitable for the third interference layer.

The thickness of the third interference layer of about 35—about 200 nm is satisfactory, and the thickness is desirably more than the step difference between the lands and the grooves (groove depth of the substrate, i.e. about 1/7–about 1/5 of laser wavelength). The sum total of the thickness of the third interference layer and the thickness of the thermal buffer layer must be more than the step difference between the lands and the grooves. When the thickness of the third interference layer is less than 35 nm or when the sum total of the thickness of the third interference layer and the thermal buffer layer is not more than the step difference between the lands and the grooves, the heat generated at the time of recording on the recording layer is transferred to the heat diffusion layer, and the record mark recorded on the adjacent tracks are liable to be erased. That is, the cross-erase phenomenon is liable to appear. When the thickness of the third interference layer is more than 200 nm, the cooling rate at the time of recording information becomes extremely low, resulting in such a trouble as less occurrence of the amorphous state (i.e. it is hard to form record marks), and at the same time, disc in-plane reflectance distribution becomes too wide, depending on the optical disc in-place thickness distribution of the third interference layer at the time of manufacturing.

Thermal Buffer Layer

Materials having complex refractive indice n and k in ranges of $1.4<n<4.5$ and $-3.5<k<-0.5$, particularly $2<n<4$ and $-3.0<k<-0.5$, are desirable for the thermal buffer layer. The thermal buffer layer absorbs light, and thus thermally stable materials are preferable, and desirably the melting point of 1,000° C. or more is required.

When a sulfide is added to the third interference layer, a particularly distinguished effect on reduction in the occurrence of cross-erase phenomenon can be obtained, but in the case of the thermal buffer layer, it is desirable that the content of the sulfide such as Zns, etc. is smaller than that of said sulfide to be added to the third interference layer, because such adverse effects as lowering of the melting point, lowering of the thermal conductivity, lowering of absorption rate, etc. are sometimes encountered otherwise.

Mixtures of metal with metal oxides, metal sulfides, metal nitrides, and metal carbides are desirable compositions for the thermal buffer layer. A mixture of Cr and $Cr_2O_3$ shows a particularly good effect on the improvement of overwriting characteristics. Particularly in the case of 60–95% Cr, materials with suitable thermal conductivity and optical constant for the present invention can be obtained. Specifically, preferable metal is, for example, Al, Cu, Ag, Au, Pt, Pd, Co, Ti, Cr, Ni, g, Si, V, Ca, Fe, Zn, Zr, Nb, Mo, Rh, Sn, Sb, Te, Ta, W, Ir and Pb and their mixtures and preferable metal oxides, metal sulfides, metal nitrides, and metal carbides are, for example, $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $MO_2$, $WO_2$, $WO_3$, $Sc_2O_3$, $Ta_2O_3$ and $ZrO_2$. Besides, oxides such as Si—O—N series material, Si—Al—N series materials, Cr—O series materials, e.g. $Cr_2O_3$, etc., Co—O series materials, e.g. $Co_2O_3$, CoO, etc., nitrides such as TaN, AlN, Si—N series materials, e.g. $Si_3N_4$, etc., Al—Si—N series materials, e.g. $AlSiN_2$, Ge—N series materials, etc., sulfides such as Zns, $Sb_2S_3$, CdS, $In_2S_3$, $Ga_2S_3$, GeS, $SnS_2$, PbS, $Bi_2S_3$, etc., selenides such as $SnSe_3$, $Sb_2S_3$, CdSe, ZnSe, $In_2Se_3$, $Ga_2Se_3$, GeSe, $GeSe_2$, SnSe, PbSe, $Bi_2Se_2$, etc., or fluorides such as CeFe, $MgF_2$, $CaF_2$, etc., or compositions near the aforementioned materials can be also used for the thermal buffer layer.

The thickness of the thermal buffer layer is desirably 10–100 nm, and in the case of 20–50 nm, a particularly good effect on the improvement of overwriting characteristics can be obtained. When the sum total of the third interference layer, the second interface layer and the thermal buffer layer is more than the groove depth, the effect on reduction in the occurrence of cross-erase phenomenon is remarkable.

As already mentioned before, the thermal buffer layer has a light-absorbing property. The thermal buffer layer also generates heat upon light absorption in the same manner as the recording layer generates heat upon light absorption. It is important that the absorbancy of the thermal buffer layer is made higher in the case of the recording layer being in an amorphous state than in the case of the recording layer being in a crystalline state. By optical design, absorbancy Aa of the recording layer in an amorphous state can be made effectively lower than absorbancy Ac of the recording layer in a crystalline state. Due to this effect, the overwriting characteristics can be largely improved. To obtain the aforementioned characteristics, it is necessary that the absorbancy of the thermal buffer layer is increased by about 30–about 405. The heat generation rate of the thermal buffer layer depends on whether the recording layer is in a crystalline state or in an amorphous state. As a result, the heat flow from the recording layer to the heat diffusion layer changes depending on the state of the recording layer, resulting in control of jitter increase due to the overwriting.

The foregoing effect can be obtained by shutting off the heat flow from the recording layer to the heat diffusion layer through temperature elevation of the thermal buffer layer. To effectively utilize the effect, it is preferable that the sum total of the third interference layer and the thermal buffer layer is more than the step difference between the lands and the grooves (groove depth of the substrate, about 1/7–about 1/5 of laser wavelength). When the sum total of the thickness of the third interference layer and the thickness of the thermal buffer layer is less than the step difference between the lands and the grooves, heat generated at the time of recording the recording layer is transferred through the heat diffusion layer, and record marks recorded on the adjacent tracks are liable to be erased.

Heat Diffusion Layer

Metals or alloys having a high reflectance and a high thermal conductivity are suitable for the heat diffusion layer, and it is desirable that total content of Al, Cu, Ag, Au, Pt and Pd is 90% or more. Materials having a high melting point and a high hardness such as Cr, Mo, W, etc., and their alloys are preferable, because they can prevent deterioration due to a flow of recording layer materials at the time of many runs of overwriting. Particularly, in the case that the heat diffusion layer containing 95% or more of Al, an information recording medium distinguished in high CNR, high recording sensitivity, and durability to many runs of overwriting, and having a very large effect on reduction in the occurrence of cross-erase phenomenon can be obtained at a low cost. Particularly in the case that the heat diffusion layer contains 95% or more of Al, an information recording medium distinguished in corrosion resistance can be obtained at a low cost. Additive elements to Al are, for example, Co, Ti, Cr, Ni, Mg, Si, V, Ca, Fe, Zn, Zr, Nb, Mo, Rh, Sn, Sb, Te, Ta, W, Ir, Pb, B and C, which are distinguished in corrosion resistance. Such additive elements as Co, Cr, Ti, Ni and Fe, effectively contribute particularly to improvement of corrosion resistance. Thickness of the heat diffusion layer is preferably 30–100 nm.

When the thickness of the heat diffusion layer is less than 30 nm, heat generated in the recording layer is hard to diffuse, and thus sometimes the recording layer is liable to be deteriorated particularly at the time of about 10,000 runs of overwriting or occurrence of the cross-erase phenomenon is liable to appear, or sometimes the heat diffusion layer is hardly used as a reflection layer because light passage therethrough, resulting in lowering of read signal amplitude.

When the metallic elements contained in the thermal buffer layer are the same as those contained in the heat diffusion layer, a large merit can be obtained manufacturing-wise. That is, two layers, i.e. the thermal buffer layer and the heat diffusion layer, can be formed with the common target. In other words, the thermal buffer layer having an appropriate refractive index is formed by sputtering a mixed gas, such as an Ar—O2 mixed gas, an Ar—N2 mixed gas, etc., thereby reacting the metallic elements with oxygen or nitrogen during the sputtering, and the heat diffusion layer of metal having a high thermal conductivity is formed by sputtering an Ar gas.

When the thickness of the heat diffusion layer is less than 200 nm, the productivity is low, and warping of the substrate, etc. takes place due to the internal stress of the heat diffusion layer, sometimes resulting in failure to conduct exact writing and reading of information. The thickness of the heat diffusion layer of 30–90 nm is more preferable because the heat diffusion layer is distinguished in corrosion resistance and productivity.

The effects of the present invention so far described in detail will be summarized as follows:

(1) Reflectance and signal amplitude can be largely improved by making the refractive index of the second interference layer smaller than that of any one of the first interference layer and the recording layer.

(2) Occurrence of a cross-erase phenomenon can be controlled by making the distance between the first interference layer and the recording layer less than dg even in the case that the thermal conductivity of the second interference layer is higher than that of the first interference layer.

(3) Oxidation of the recording layer by oxygen diffused from the second interference layer can be controlled by providing an oxygen barrier layer having a small oxygen content than that of the second interference layer between the second interference layer and the recording layer, whereby a distinguished information recording medium without the deterioration of overwriting at the time of many runs of overwriting and without lowering of storage life can be manufactured at a low cost.

(4) The second interference layer of $SiO_2$, $Al_2O_3$, $MgO$, etc. requiring a long time in the layer formation can be made by providing an oxygen barrier layer between the second interference layer and the recording layer and by reactive sputtering between a sputtering target such as Si, Al, Mg, etc. and a sputtering gas containing oxygen, because when the second interference layer is formed by reactive sputtering, diffusion of oxygen from the second interference layer into the recording layer can be controlled.

(5) Since the second interference layer can be formed by reactive sputtering, the sputtering time can be largely shortened, whereby deformation of the substrate due to the increase in the substrate temperature during the sputtering can be controlled. Furthermore, an information recording medium without deterioration of overwriting at the time of many runs of overwriting and without lowering of storage life can be manufactured.

(6) Since the second interference layer can be formed by reactive sputtering, the sputtering power source can be changed from a RF power source to a relatively cheap DC power source.

(7) By making the distance between the first interference layer and the recording layer less than the groove depth, the occurrence of a cross-erase phenomenon can be controlled even in the case of using oxides of Si, Al and Mg having a high thermal conductivity for the second interference layer.

(8) When the second interference layer contains oxides of Si, Al and Mg, such an effect that the refractive index of the second interference layer can be lowered to about 1.4–1.7 can be obtained, and thus the present information recording medium can be easily structured. Dielectrics of $(Zn)x(SiO_2)_{1-x}$ series (x=0.5–0.95) have a higher refractive index than that of the above-mentioned oxides, and also a lower thermal conductivity are most suitable materials for the first interference layer.

(9) When the oxygen barrier layer contains nitrides of S, Al and Mg, the oxygen barrier layer can have a lower light absorption coefficient and a smaller oxygen content than that of the second interference layer can be easily formed. Thus, the present information recording medium can be easily structured. As a result, the present information recording medium without deterioration of overwriting at the time of many runs of overwriting and without lowering of storage life can be manufactured at a low cost.

(10) When the second interference layer is made from a mixture of nitrogen oxides of Si, Al and Mg and the oxygen barrier layer is made from a mixture of nitrides of Si, Al and Mg, excess oxygen, even if present in the second interference layer, is replaced with nitrogen in the second interference layer before diffusion into the recording film or in the oxygen barrier layer, and thus the excess oxygen is hard to diffuse into the recording layer.

(11) When the second interference layer is made from oxides of Si, Al and Mg, and the oxygen barrier layer is made from unsaturated oxides of the aforementioned oxides, excess oxygen in the second interference layer is trapped by oxidizing Si, Al and mg while passing through the oxygen barrier layer, and thus the oxygen is hard to diffuse into the recording layer.

(12) When the second interference layer and the oxygen barrier layer are formed by a common sputtering target, the second interference layer is formed with a sputtering gas containing oxygen and the oxygen barrier layer is formed with a sputtering gas having a smaller oxygen content than at least in the case of forming the second interference layer, the sputtering time can be largely shortened, and also a number of chambers in the sputtering apparatus can be reduced, whereby deformation of the substrate due to the increase in the substrate temperature during the sputtering can be controlled, and at the same time the present information recording medium without deterioration of overwriting at the time of many runs of overwriting and without lowering of the storage life can be manufactured by a relatively cheap sputtering apparatus.

(13) When the second interference layer and the oxygen barrier layer are formed by a common sputtering target, the second interference layer is formed with a sputtering gas containing oxygen and the oxygen barrier layer is formed with a sputtering gas having a larger nitrogen content than at least in the case of forming the second interference layer, the sputtering time can be largely shortened, and also a number of chambers in the sputtering apparatus can be reduced, whereby deformation of the substrate due to the increase in the substrate temperature during the sputtering can be controlled, and at the same time the present information recording medium without deterioration of overwriting at the time of many runs of overwriting and without lowering of the storage life can be manufactured by a relatively cheap sputtering apparatus.

(14) The refractive index of the second interference layer can be easily lowered by using a sputtering target of any one element of Si, Al and Mg or a sputtering target made from a mixture of these elements, and thus the preset information recording medium can be easily and effectively manufactured.

What is claimed is:

1. An information recording medium for recording information by changes in at least one of atomic arrangement and electronic state by laser beam irradiation, which comprises at least a substrate having a groove shape with a groove depth dg, and a recording layer having a shape corresponding to the groove shape, and three thin film layers of different compositions comprising a first interference layer, a second interference layer and a first interface layer, successively formed in this order from the laser beam incident side of the recording layer, the thermal conductivity of the first interference layer being lower than that of the second interference layer, the refractive index of the second interference being smaller than that of any of the first interference layer and the recording layer, the first interface layer being provided in contact with the recording layer and between the second interference layer and the recording layer, the second interference layer containing oxygen, a protective layer having a smaller oxygen content than that of the second interference layer being provided between the second interference layer and the first interface layer, and the distance between the first interference layer and the recording layer being less than dg.

2. An information recording medium for recording information by changes in at least one of atomic arrangement and electronic state by laser beam irradiation, which comprises at least a substrate having a groove shape with a groove depth dg, and a recording layer having a shape corresponding to the groove shape, and two thin film layers of different compositions comprising a first interference layer and a second interference layer, successively formed in this order from the laser beam incident side of the recording layer, the thermal conductivity of the first interference layer being lower than that of the second interference layer, the refractive index of the second interference layer being smaller than that of any of the first interference layer and the recording layer, the second interference layer containing oxygen, a protective layer having a smaller oxygen content than that of the second interference layer and containing the element as the element to be oxidized in the second interference layer being provided between the second interference layer and the recording layer, and the distance between the first interference layer and the recording layer is less than dg.

3. An information recording medium according to claim 2, wherein at least the second interference layer is composed of an oxide of any one element selected from S, Al and Mg, or a mixture of oxides of Si, Al and Mg, and the protective layer is composed of a nitride of any one element selected from Si, Al and Mg, or a mixture of oxides of Si, Al and Mg.

4. An information recording medium according to claim 2, wherein at least the second interference layer is composed of a nitrogen oxide of any one element selected from Si, Al and Mg, or a mixture thereof, and the protective layer is composed of a nitride of any one element selected from Si, Al and Mg or a mixture thereof.

5. An information recording medium according to claim 2, wherein at least the second interference layer is composed of an oxide of any one element selected from Si, Al and Mg, or a mixture thereof, and the protective layer is composed of an unsaturated oxide corresponding to the above-mentioned oxide or a mixture thereof, or any one element selected from Si, Al and Mg or a mixture thereof.

6. An information recording medium according claim 2, wherein the thickness of the protective layer is 2 to 15 nm.

7. An information recording medium according to claim 2, wherein the thickness of the protective layer is 2–15 nm.

8. A method of manufacturing an information recording medium, which comprises a step of forming a first interference layer on a substrate, a step of forming a second interference layer having a smaller refractive index than that of the first interference layer on the first interference layer by a sputtering method using an oxygen-containing sputter gas and a sputtering target, a step of forming a protective layer having a smaller oxygen content than that of the second interference layer on the second interference layer by a sputtering method using same sputter target and a sputtering gas containing less oxygen than the sputtering gas used for forming the second interference layer, and a step of forming a recording layer after the step of forming the protective layer.

9. A method for manufacturing an information recording medium, which comprises a step of forming a first interference layer on a substrate, a step of forming a second interference layer having a smaller refractive index than that of the first interference layer on the first interference layer by a sputtering method using an oxygen-containing sputtering gas and a sputtering target, a step of forming a protective layer having a smaller oxygen content than that of the second interference layer on the second interference layer by a sputtering method using the same sputtering target and a sputtering gas containing more nitrogens than the sputtering gas used for forming the second interference, and a step of forming a recording layer after the step of forming the protective layer.

10. A method for manufacturing an information recording medium according to claim 8, wherein the sputtering target is a sputtering target composed of any one element selected from Si, Al and Mg or of a mixture of these elements.

11. A method for manufacturing an information recording medium according to claim 8, wherein the sputtering target is a sputtering target composed of an oxide or an unsaturated oxide of any one of elements selected from Si, Al and Mg or of a mixture thereof.

12. A method for manufacturing an information recording medium according to claim 9, wherein the sputtering target is a sputtering target composed of any one element selected from Si, Al and Ag or of a mixture of these elements.

13. A method for manufacturing an information recording medium according to claim 9, wherein the sputtering target is a sputtering target composed of an oxide or an unsaturated oxide of any one of elements selected from Si, Al and Mg or of a mixture thereof.

* * * * *